Sept. 15, 1953  J. B. THOMAS ET AL  2,651,988
STENCIL PRINTING APPARATUS
Filed Feb. 5, 1947  14 Sheets-Sheet 1

INVENTORS
JOHN B. THOMAS
AND
COURTNEY E. MOORHOUSE
BY
ATTORNEY

Sept. 15, 1953   J. B. THOMAS ET AL   2,651,988
STENCIL PRINTING APPARATUS
Filed Feb. 5, 1947   14 Sheets-Sheet 2
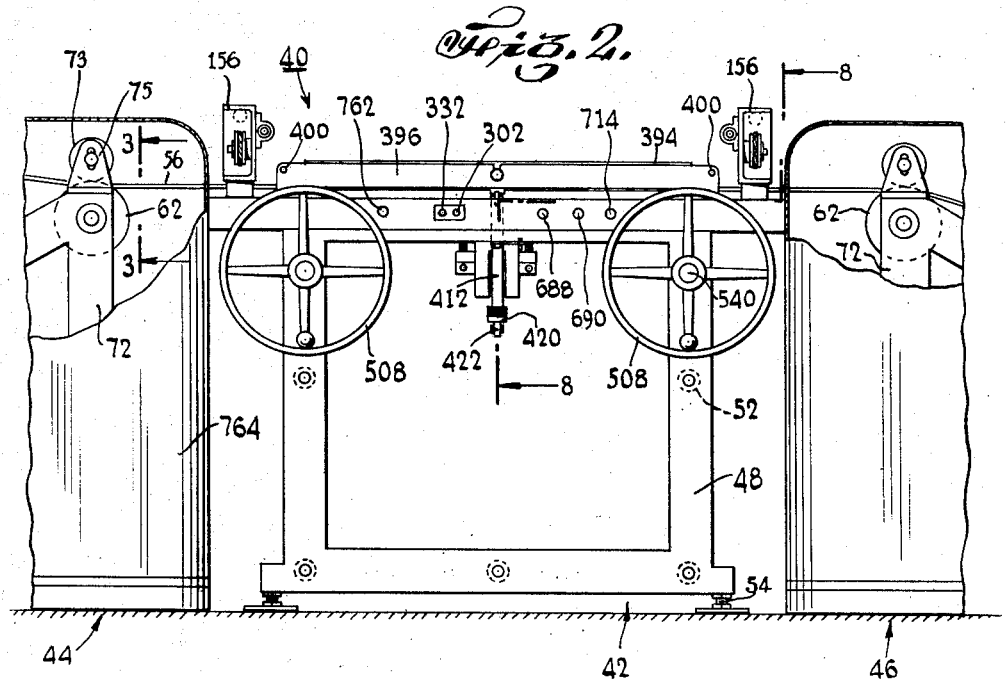
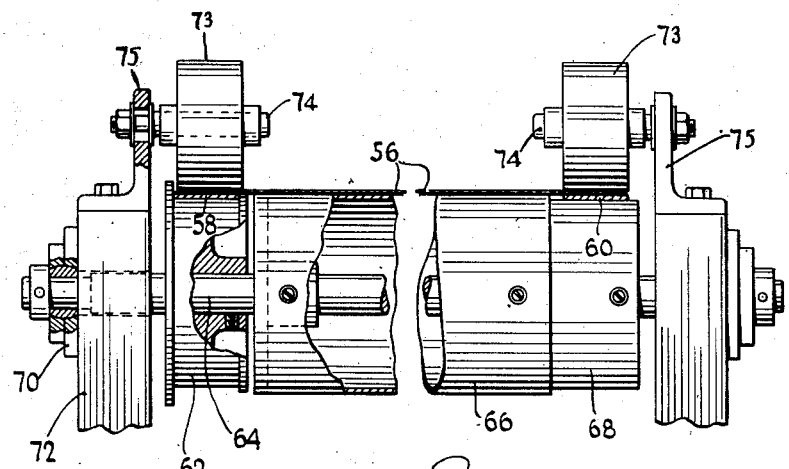
INVENTORS
JOHN B. THOMAS
AND
COURTNEY E. MOORHOUSE
BY
ATTORNEY Sept. 15, 1953 J. B. THOMAS ET AL 2,651,988
STENCIL PRINTING APPARATUS
Filed Feb. 5, 1947 14 Sheets-Sheet 3
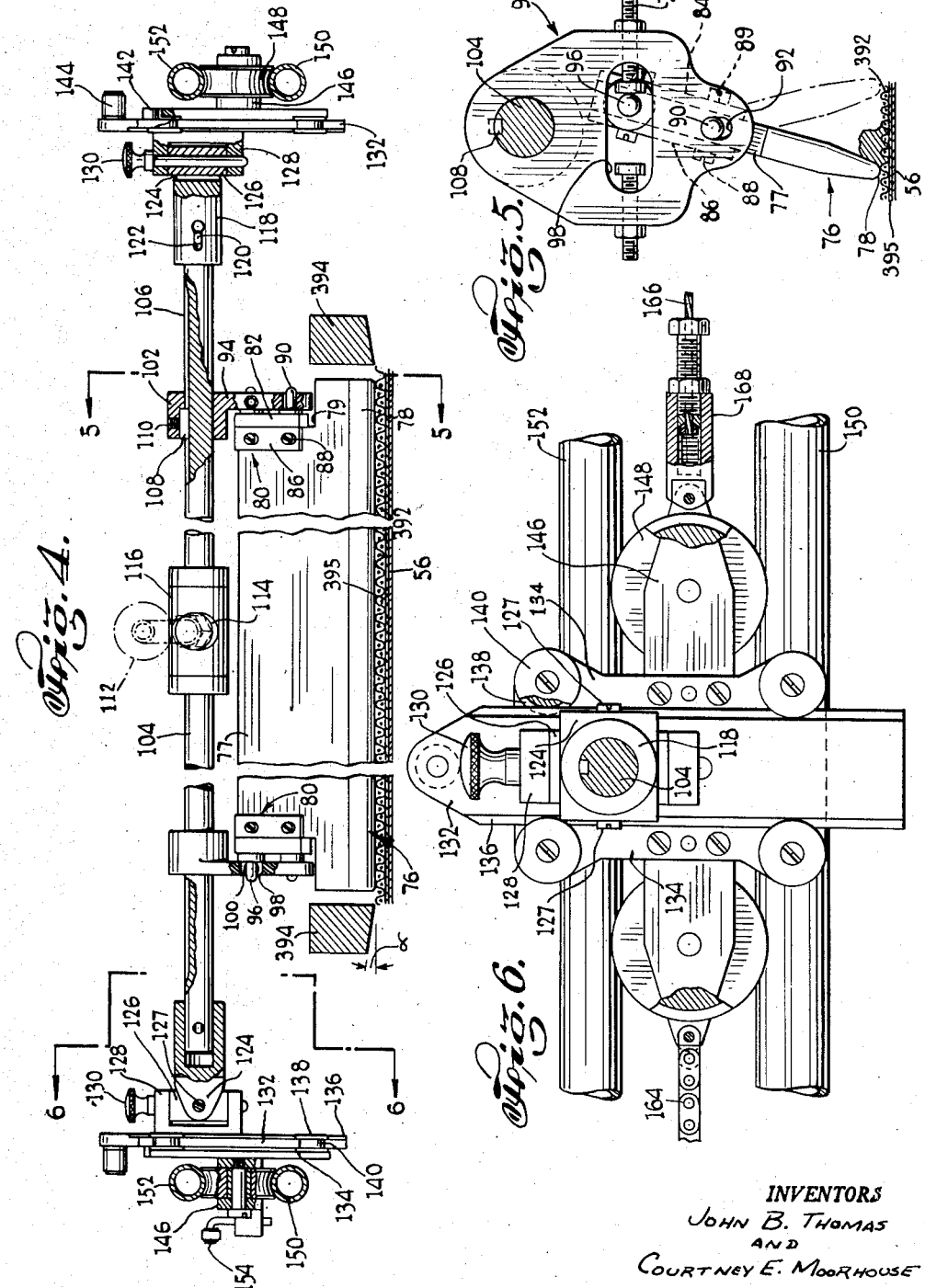
INVENTORS
John B. Thomas
AND
Courtney E. Moorhouse
BY
ATTORNEY Sept. 15, 1953 J. B. THOMAS ET AL 2,651,988
STENCIL PRINTING APPARATUS
Filed Feb. 5, 1947 14 Sheets-Sheet 4
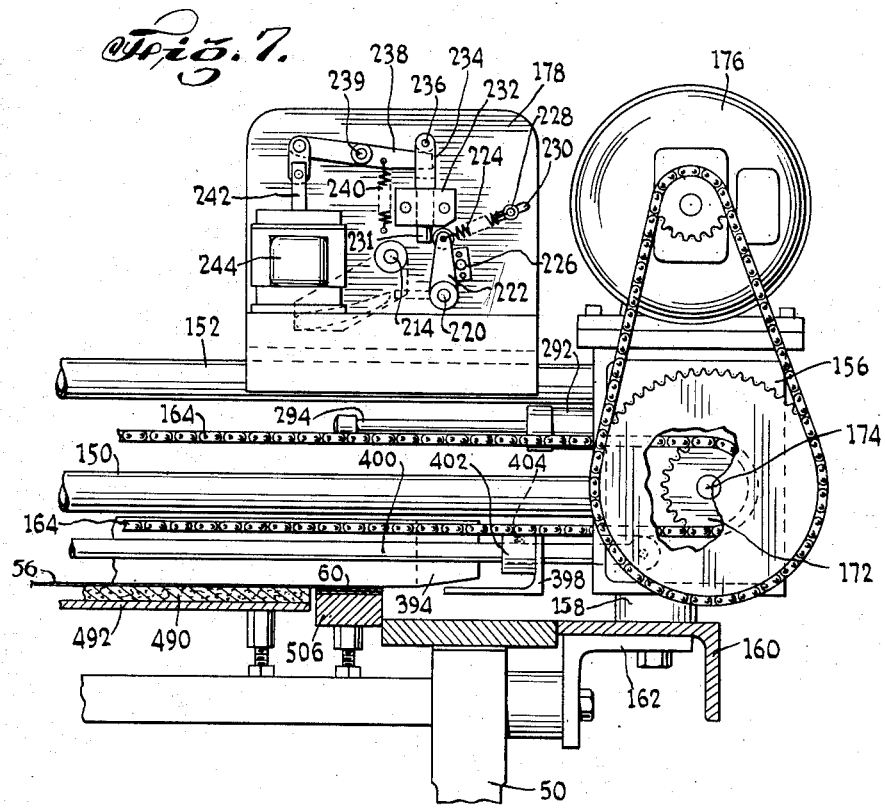
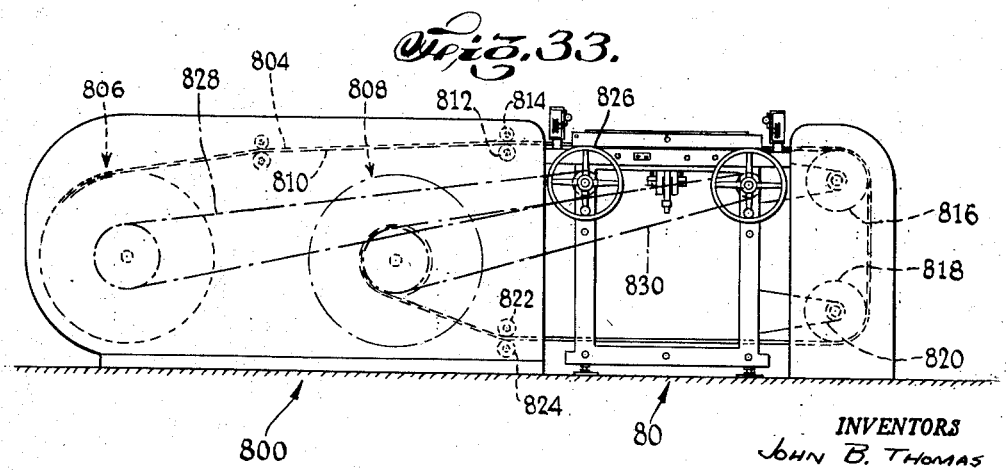
INVENTORS
JOHN B. THOMAS
AND
COURTNEY E. MOORHOUSE
BY
ATTORNEY Sept. 15, 1953 J. B. THOMAS ET AL 2,651,988
STENCIL PRINTING APPARATUS
Filed Feb. 5, 1947 14 Sheets-Sheet 5

INVENTORS
JOHN B. THOMAS
AND
COURTNEY E. MOORHOUSE
BY
ATTORNEY

Sept. 15, 1953   J. B. THOMAS ET AL   2,651,988
STENCIL PRINTING APPARATUS
Filed Feb. 5, 1947   14 Sheets-Sheet 6
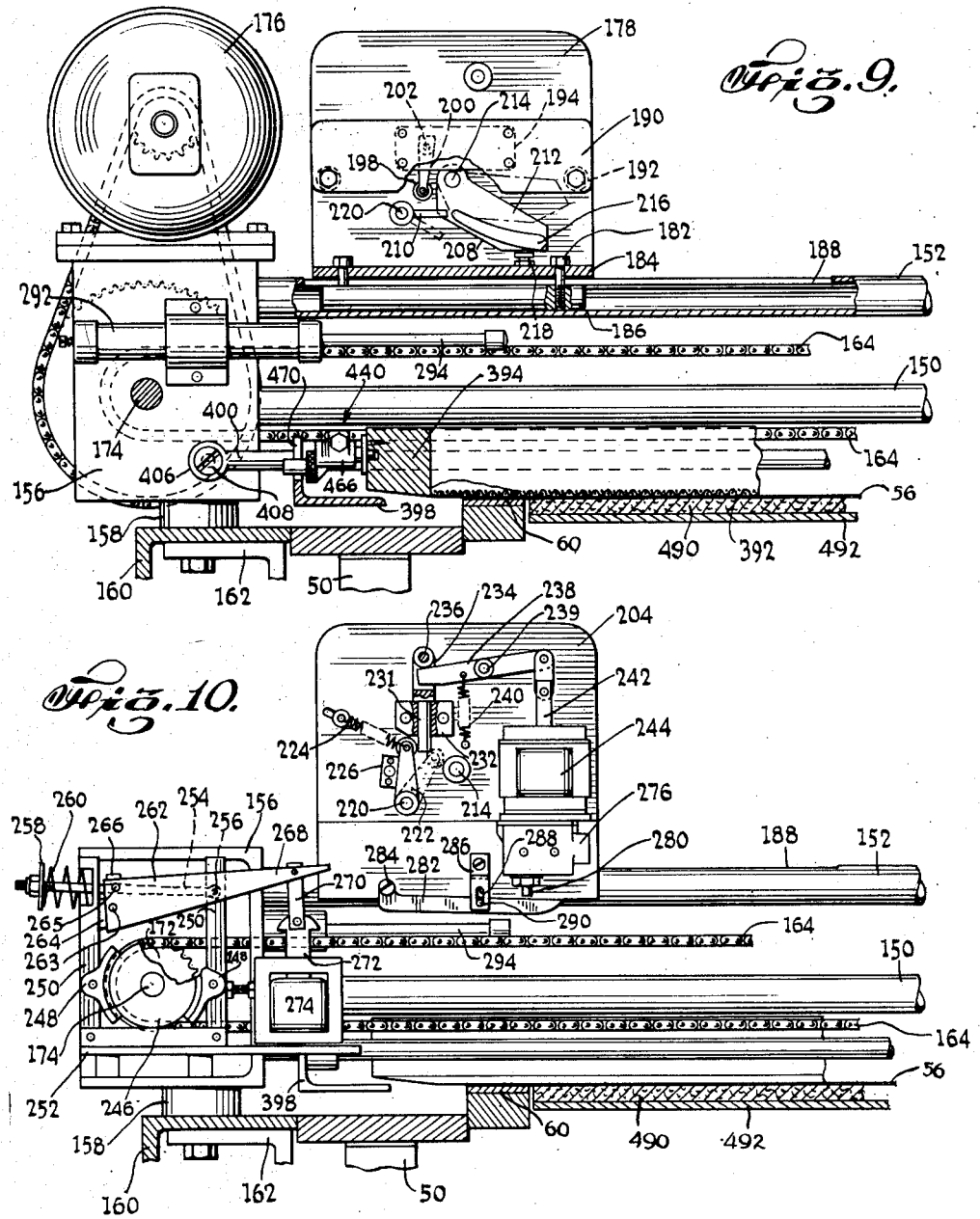
INVENTORS
John B. Thomas
AND
Courtney E. Moorhouse
BY
ATTORNEY

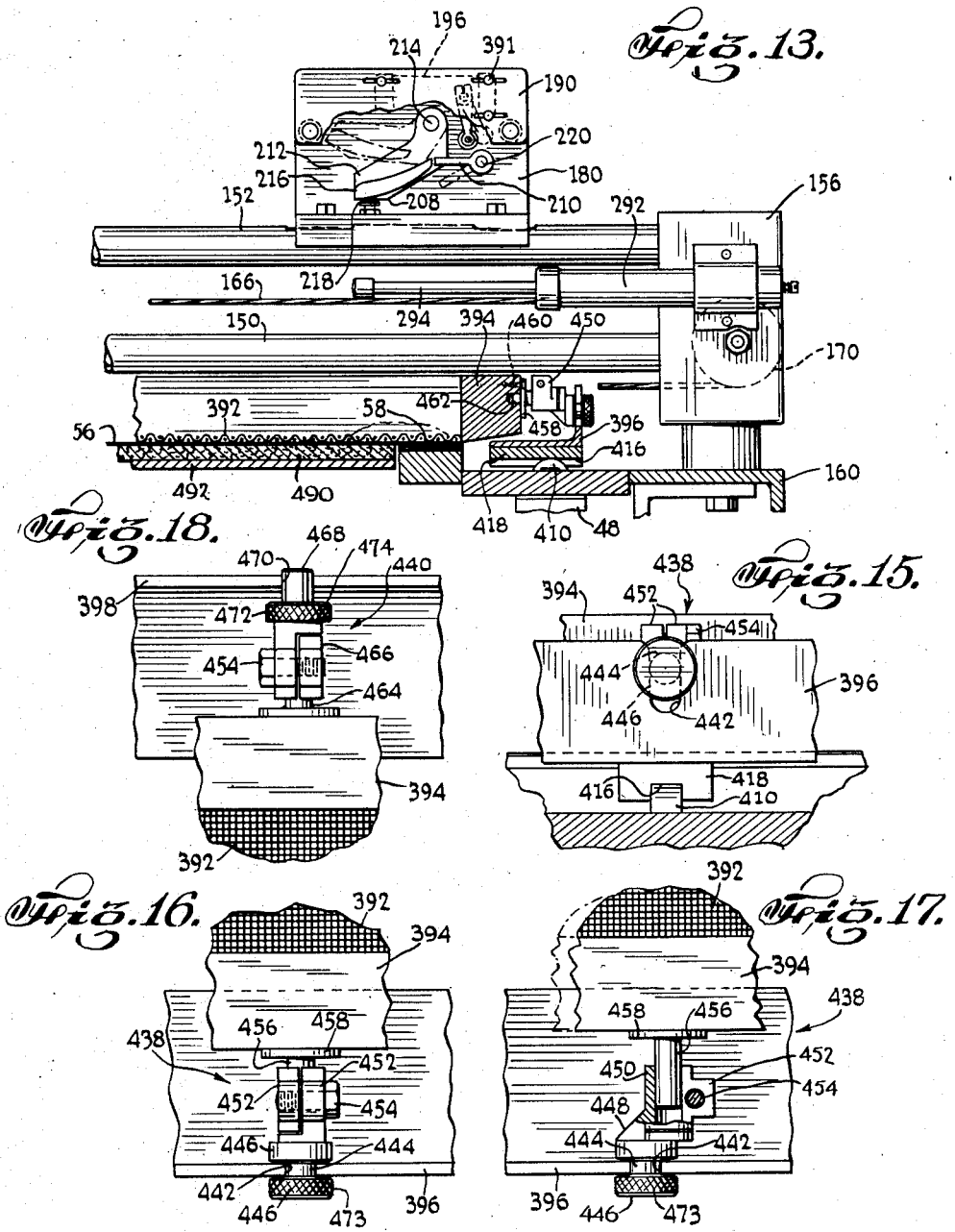

Sept. 15, 1953     J. B. THOMAS ET AL     2,651,988
STENCIL PRINTING APPARATUS
Filed Feb. 5, 1947     14 Sheets-Sheet 10
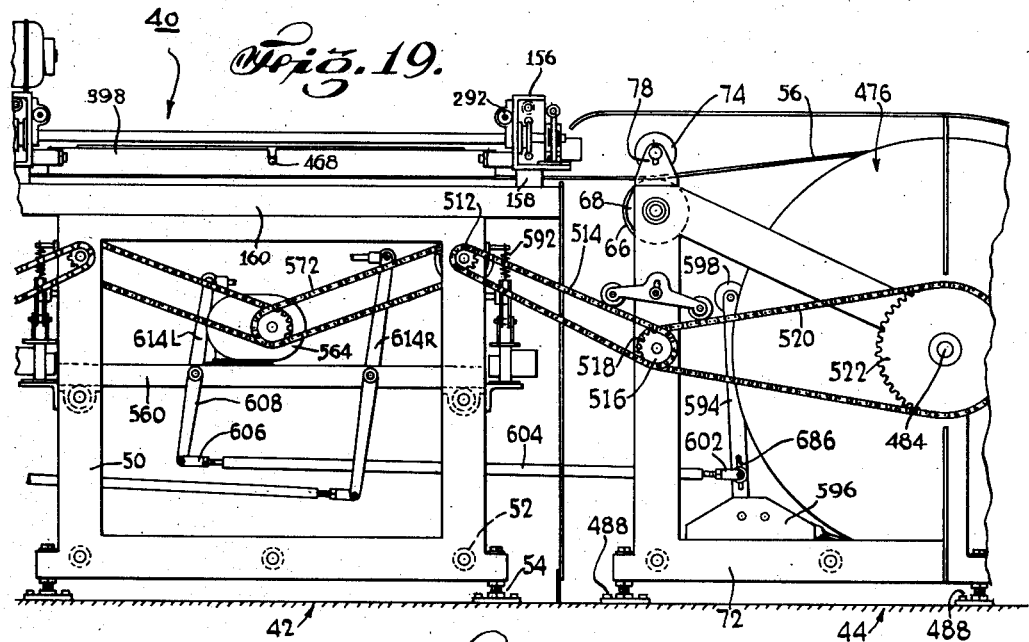
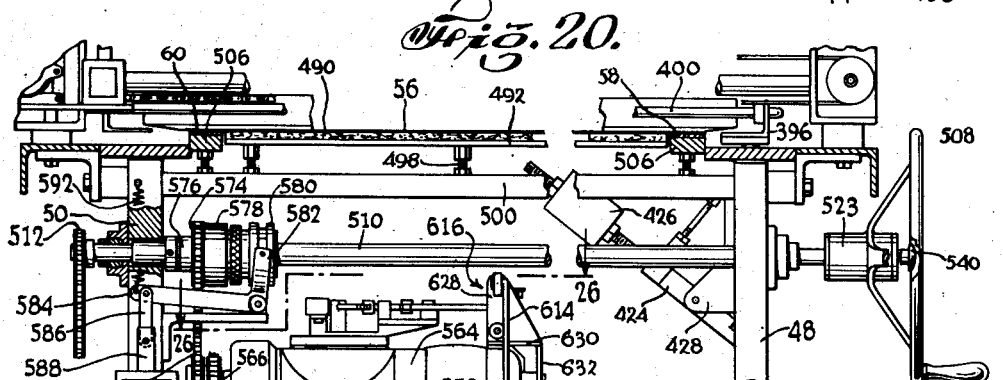
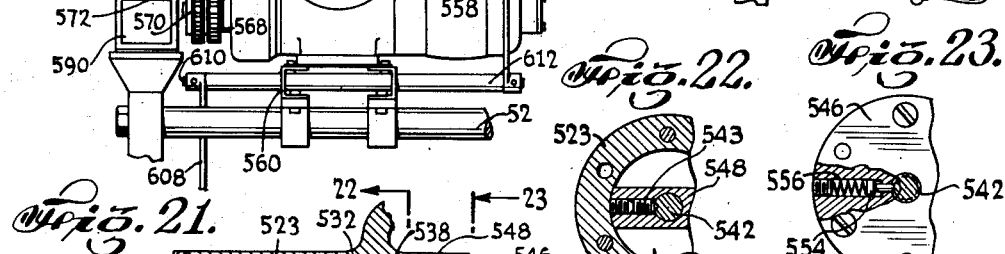
INVENTORS
JOHN B. THOMAS
AND
COURTNEY E. MOORHOUSE
BY
ATTORNEY Sept. 15, 1953  J. B. THOMAS ET AL  2,651,988
STENCIL PRINTING APPARATUS
Filed Feb. 5, 1947  14 Sheets-Sheet 11
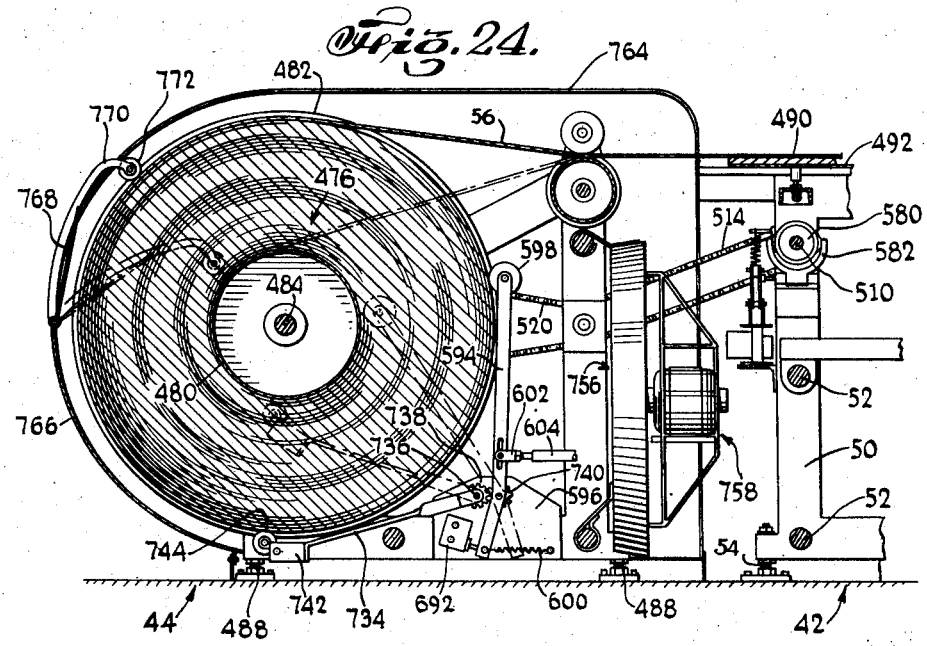
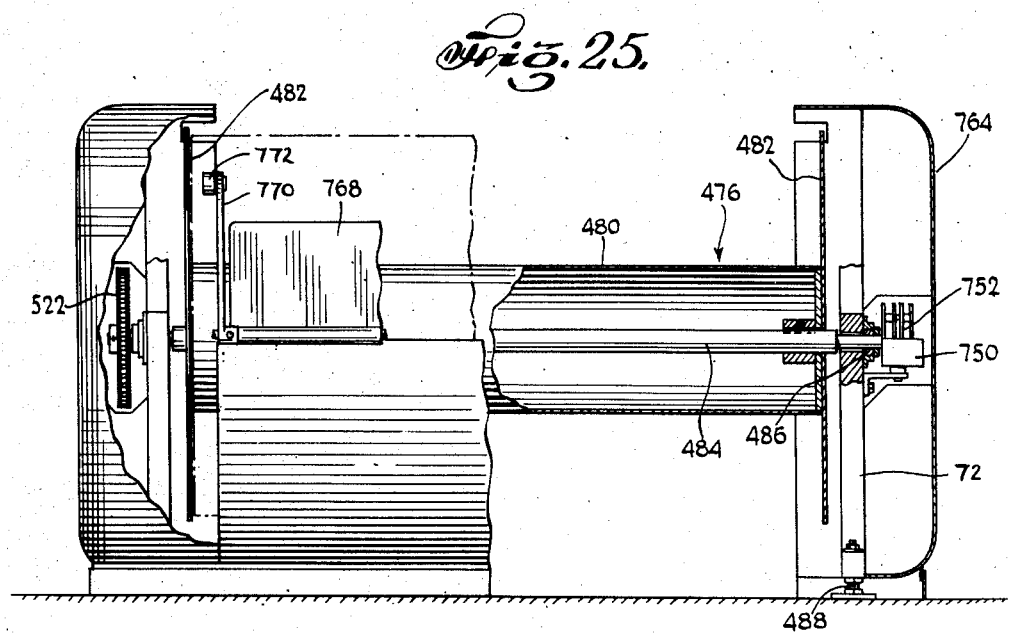
INVENTORS
JOHN B. THOMAS
AND
COURTNEY E. MOOREHOUSE
ATTORNEY

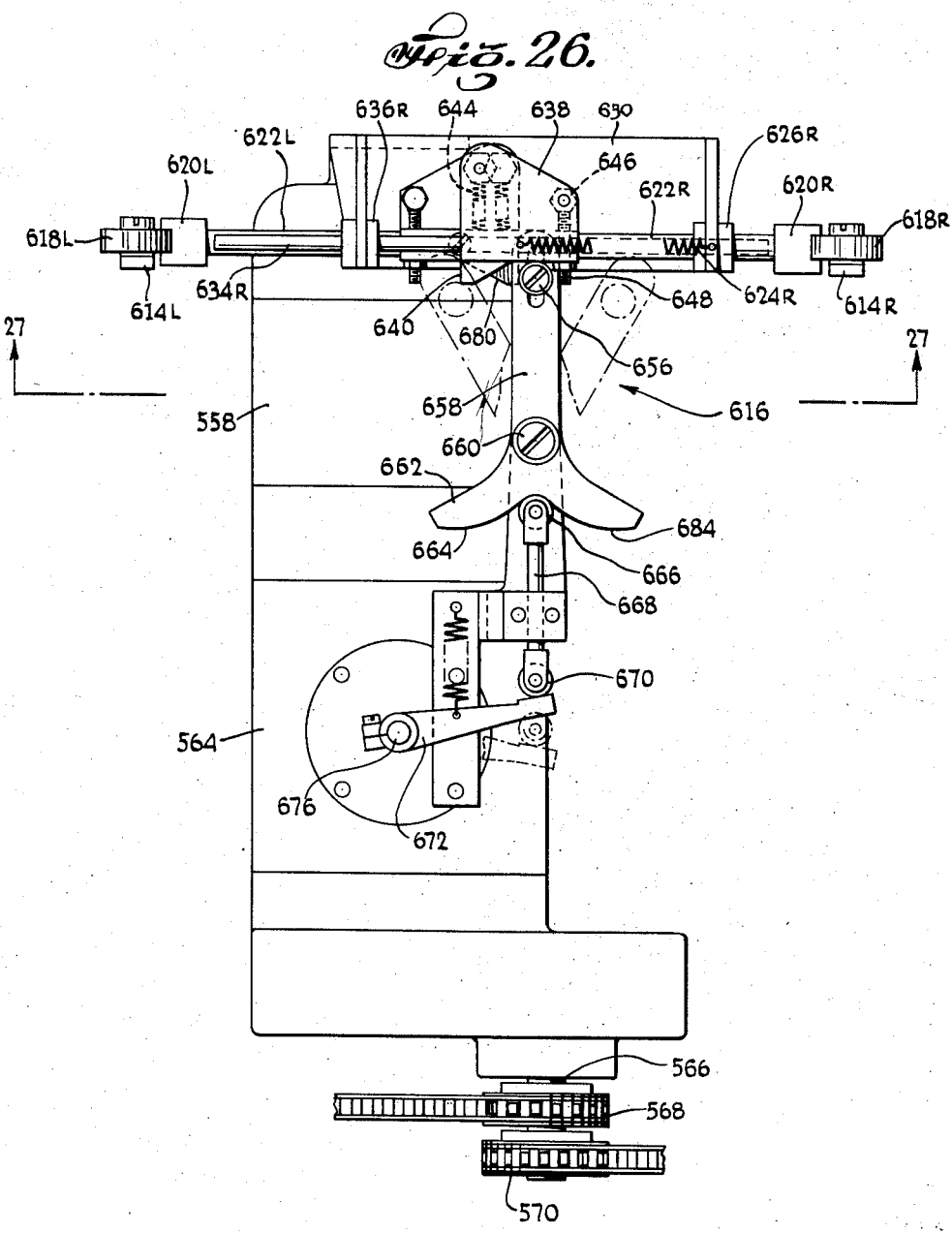

Sept. 15, 1953 J. B. THOMAS ET AL 2,651,988
STENCIL PRINTING APPARATUS
Filed Feb. 5, 1947 14 Sheets-Sheet 13
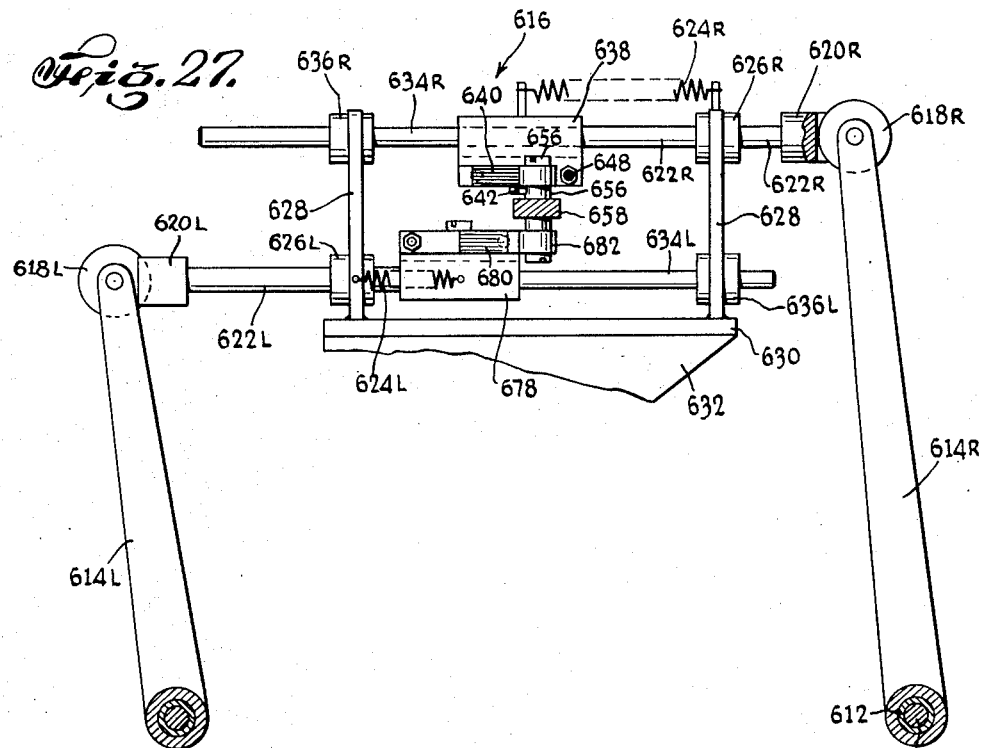
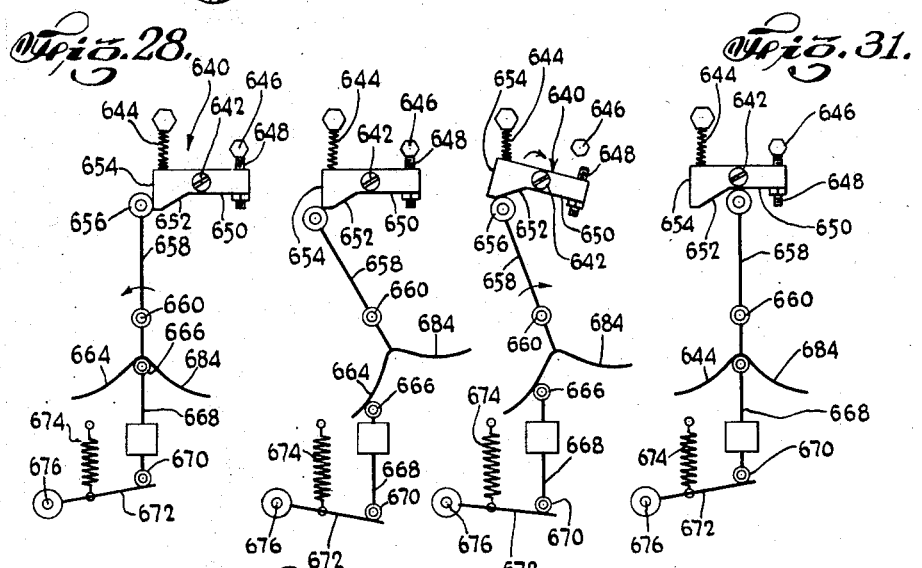
INVENTORS
JOHN B. THOMAS
AND
COURTNEY E. MOORHOUSE
BY
ATTORNEY

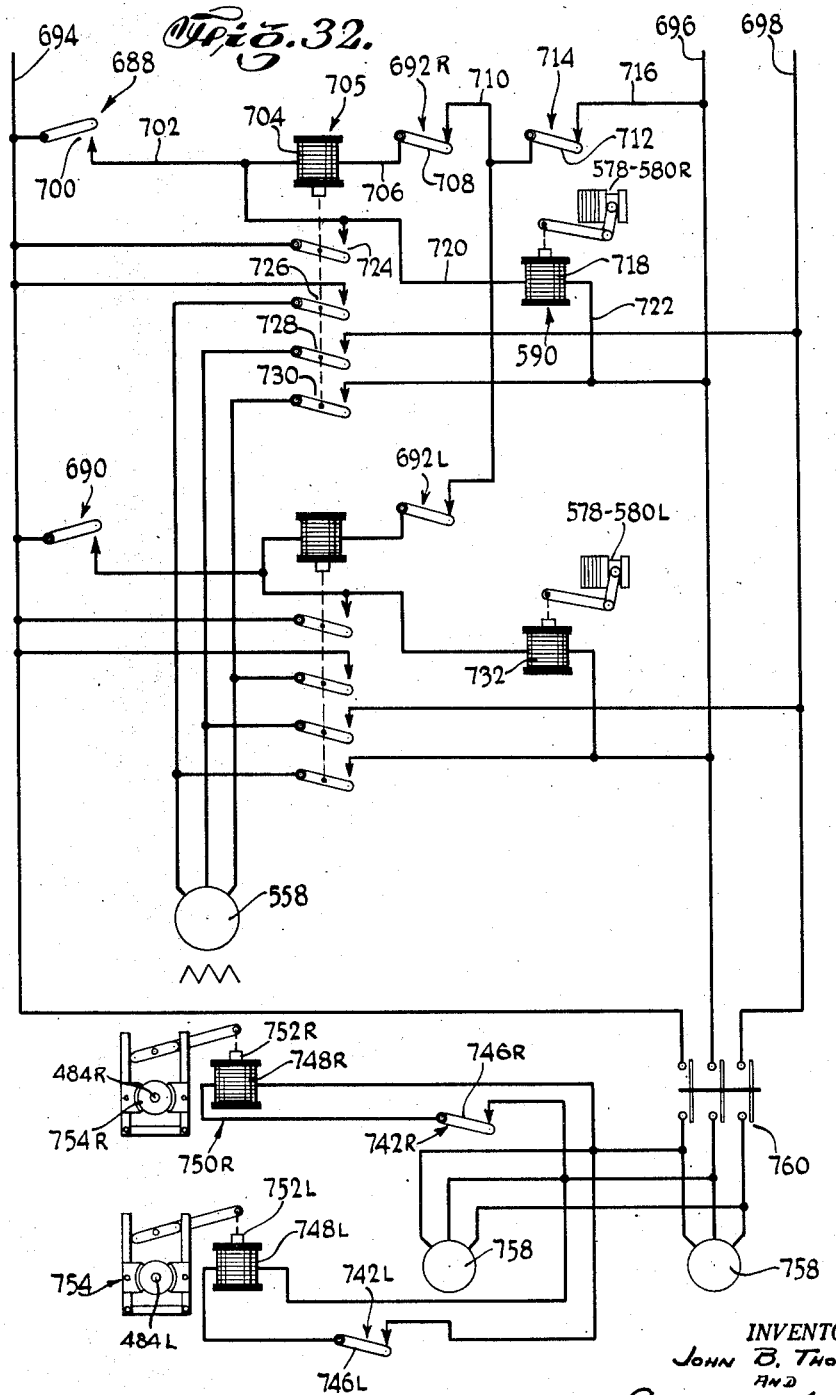

Patented Sept. 15, 1953

2,651,988

UNITED STATES PATENT OFFICE 2,651,988

STENCIL PRINTING APPARATUS

John B. Thomas, Watertown, and Courtney E. Moorhouse, Waterbury, Conn., assignors to Roto-Matic Screen Printer, Ltd., New York, N. Y., a corporation of New York Application February 5, 1947, Serial No. 726,504

34 Claims. (Cl. 101—123)

This invention relates to an apparatus for printing sheets such as textile fabric webs, plastic films and paper with the aid of a stencil. For simplicity, such apparatus will be referred to hereinafter simply as a "silk screen printing machine," it being understood that said term is merely a trade designation for a stencil printing machine and does not indicate that the stencil necessarily is of silk.

It is an object of our invention to provide a silk screen printing machine capable of being power driven, and which yet comprises relatively few and simple parts and is positive and efficient in operation.

It is another object of our invention to provide a power driven silk screen printing machine which is rugged in construction and is easy to disassemble for repair and replacement of parts.

It is another object of our invention to provide a power driven silk screen printing machine which will print uniformly, clearly and accurately even when run by an unskilled operator.

It is another object of our invention to provide a power driven silk screen printing machine which is semiautomatic in operation and will very quickly complete a printing cycle.

It is another object of our invention to provide a power driven silk screen printing machine in which the length of stroke of the scraper blade can be varied easily, and in which the sundry means effective as the scraper approaches the ends of its forward and return strokes can be quickly and accurately integrated into the printing cycle. It may be mentioned here that this object of our invention is, in general, attained by having the aforesaid means controlled by the scraper itself, or by a part or parts moving therewith. These scraper-controlled means, by way of example, include the means for reversing the direction of travel of the scraper, the means for checking the scraper as it nears the ends of its strokes, the means for raising and lowering the scraper at the ends of its strokes, and the means for stopping the scraper in raised position at the end of its return stroke.

It is another object of our invention to provide a power driven silk screen printing machine in which the scraper is driven at a uniformly high speed throughout substantially the full length of its forward and return stroke and is checked only at the very ends of its strokes.

It is another object of our invention to provide a power driven silk screen printing machine in which the scraper is quickly and surely stopped at the ends of both of its strokes without, however, creating a sudden impact strain which would unduly stress or loosen any part of the machine.

It is another object of our invention to provide a power driven silk screen printing machine in which a novel but extremely simple mechanism is employed to raise and lower the scraper at ends of both of its strokes.

It is another object of our invention to provide a power driven silk screen printing machine in which the sundry scraper-controlled mechanisms are kinematically unconnected to the scraper so that the overall construction of the machine is kept light and relatively uncomplicated.

It is another object of our invention to provide a machine of the character described in which the various controls are electrically operated, and are governed through switches or the like by movement of the scraper, this term, when used for control and movement herein, including parts movable to and fro with the scraper.

It is another object of our invention to provide a silk screen printing machine having an improved means for maintaining the web carrying blanket in proper transverse (front to back) registry, said means being such that it will not impose much wear on the blanket or any of its parts.

It is another object of our invention to provide a silk screen printing machine in which the printing table may be adjusted to provide a desirable printing surface of any vertical profile, even skew if such a surface is required.

It is another object of our invention to provide, in a silk screen printing machine having a scraper which is lowered as it starts its forward and return strokes, a scraper mounting such as to minimize shock when the scraper hits the screen and to allow the scraper to level itself in the event one end thereof descends ahead of the other.

It is another object of our invention to provide, in a power driven silk screen printing machine in which both ends of the scraper are moved back and forth across the printing table in substantial synchronism, a scraper mounting such as to allow the movement of said ends to be slightly asynchronous.

It is another object of our invention to provide a power driven means for moving the blanket at a uniform linear speed, particularly during drying and application of a textile web.

It is another object of our invention to provide a silk screen printing machine in which the blanket is prevented from sagging on the reels at such time as the same are not being turned, whereby to keep the blanket compactly wound and to prevent the textile web from brushing against the floor or machine parts.

It is another object of our invention to provide a power driven silk screen printing machine which optionally may be hand actuated, being so constructed that when the power driven means is rendered effective the hand actuated reel turning means may be disengaged, whereby an operator cannot be caught in a rapidly moving actuating handle.

It is another object of our invention to provide a silk screen printing machine in which an air blast is directed onto the surface of the web on the take-up reel, and in which the direction of the air blast is varied as the reel fills up so that said blast will always strike the freshly printed portion of the web.

It is another object of our invention to provide a silk screen printing machine having an improved mechanism for adjusting the position of the front and back ends of the stencil screen.

Other objects of our invention will in part be obvious and in part be hereinafter pointed out.

Our invention accordingly consists in the features of construction, combinations of elements and arrangements of parts which will be exemplified in the constructions hereafter described, and of which the scope of application will be indicated in the appended claims.

In the accompanying drawings in which are shown various possible embodiments of our invention, Fig. 1 is a top plan view of a power driven silk screen printing machine constructed in accordance with our invention, and with many details (elsewhere shown) omitted in order to prevent confusion;

Fig. 2 is a front view of said machine, various details likewise being omitted;

Fig. 3 is an enlarged sectional view taken substantially along the line 3—3 of Fig. 2, and is explanatory of the construction of the keeper wheel, and the idler and guide roll for maintaining the blanket in proper transverse registry;

Fig. 4 is an enlarged sectional view taken substantially along the line 4—4 of Fig. 1, and is explanatory of the construction of the scraper;

Fig. 5 is an enlarged sectional view taken substantially along the line 5—5 of Fig. 4, and is explanatory of the construction which allows limited oscillation of the scraper;

Fig. 6 is an enlarged sectional view taken substantially along the line 6—6 of Fig. 4, and is explanatory of the construction of the scraper truck and the mechanism for imposing a uniform floating pressure upon the scraper;

Fig. 7 is an outer side view of the scraper actuated control mechanism at the right rear corner of the printing table, the same being taken substantially along the line 7—7 of Fig. 1;

Figure 1:
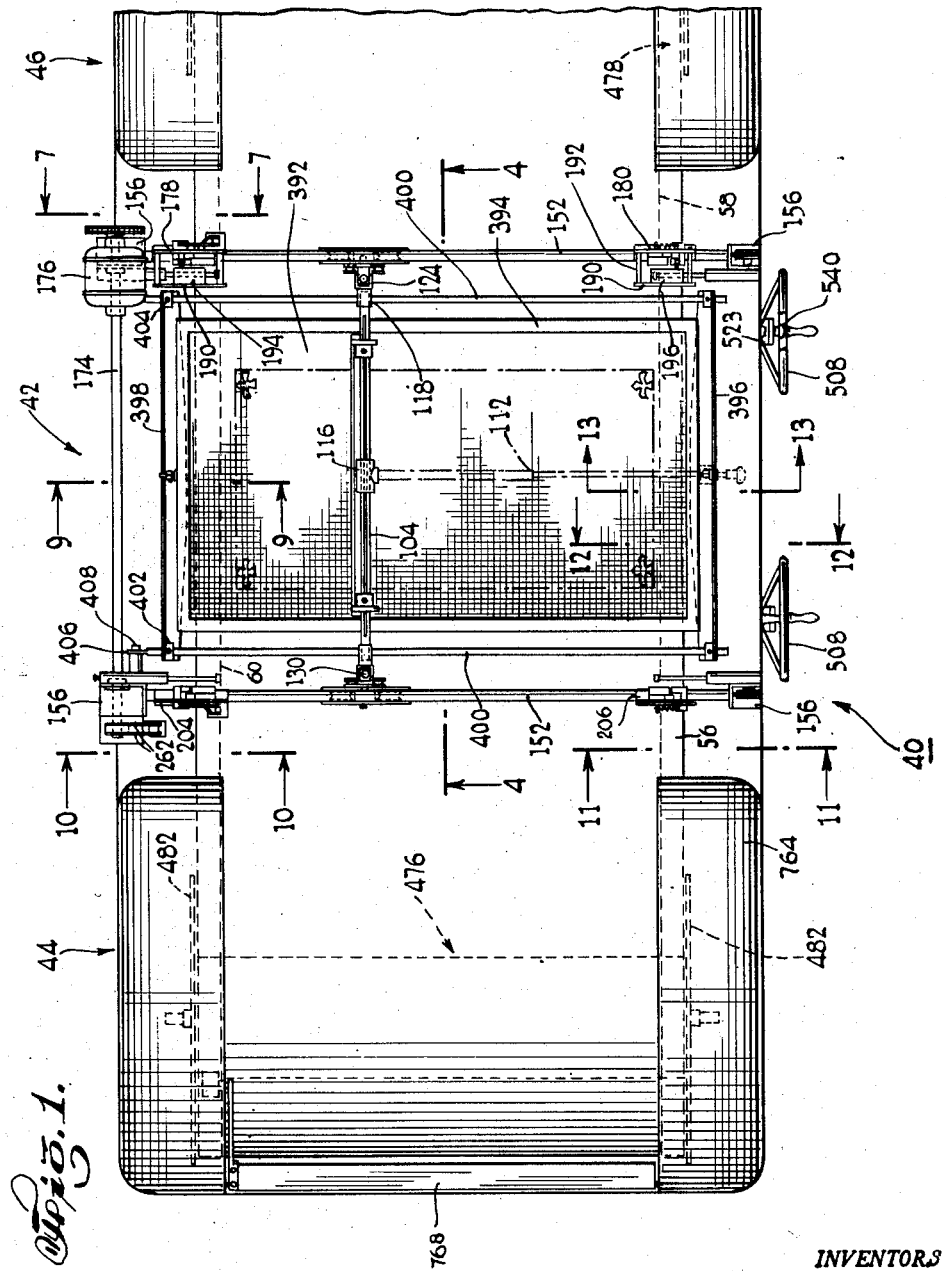
Figure 8:
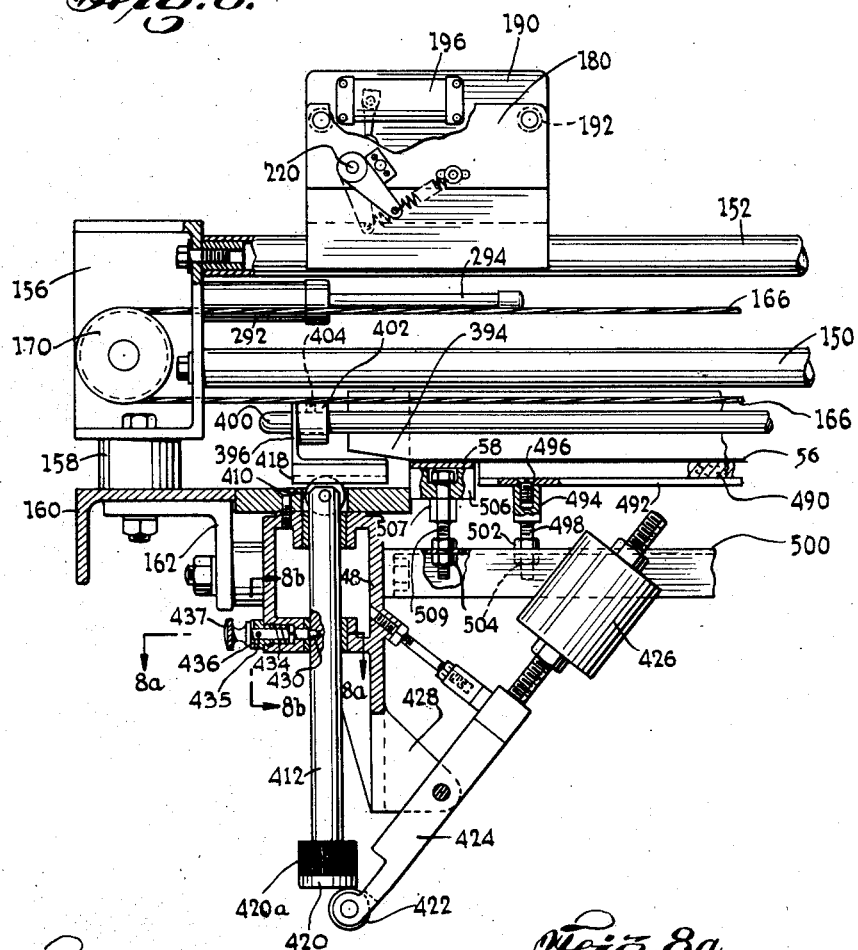
Fig. 8 is an enlarged sectional view taken substantially along the line 8—8 of Fig. 2, and comprises in part an outer side view of the scraper actuated control mechanism at the right front corner of the printing table.
Figure 8B:
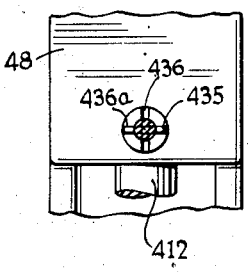
Figure 8A:
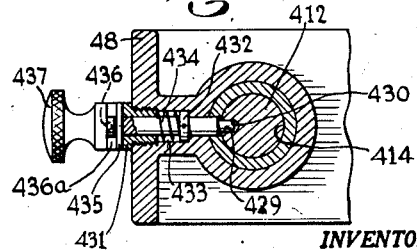
Figure 11:
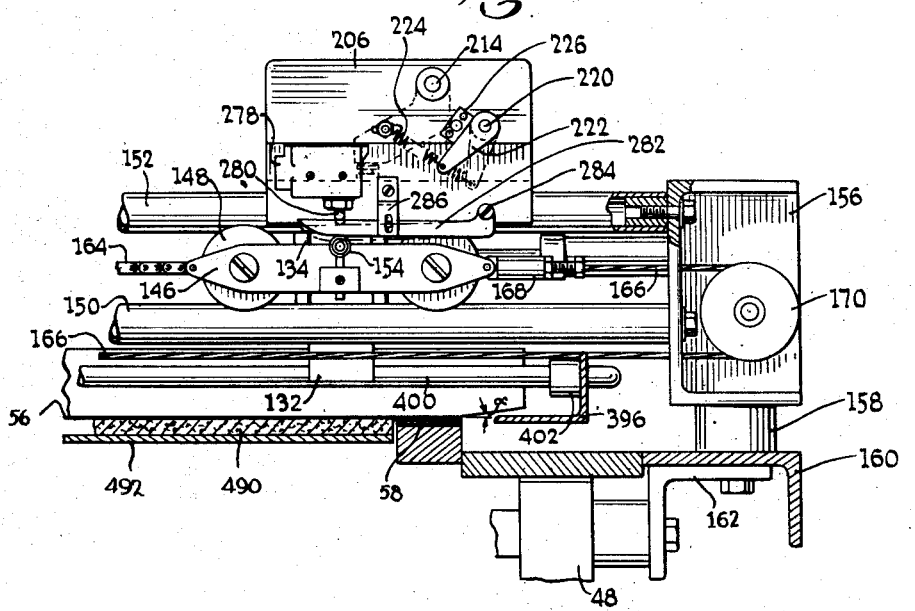
Figure 12:
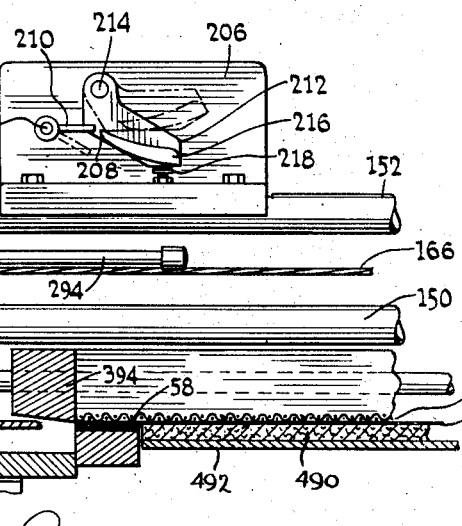
Figure 14:
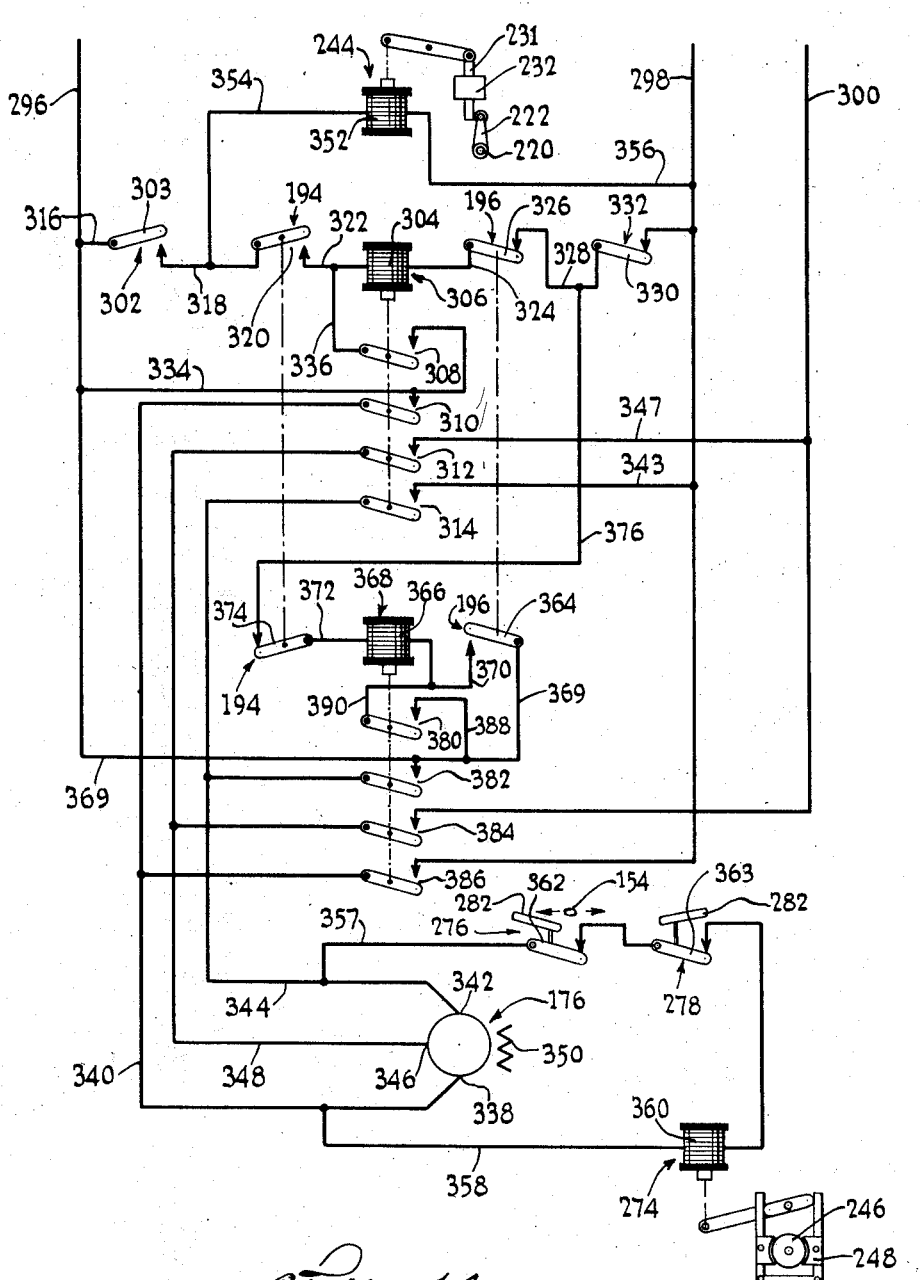

Figs. 8a and 8b are fragmentary sectional views taken substantially along the lines 8a—8a and 8b—8b, respectively, of Fig. 8;

Fig. 9 is an inner side view of the scraper actuated control mechanism at the right rear corner of the printing table, the same being taken substantially along the line 9—9 of Fig. 1;

Fig. 10 is an outer side view of the scraper actuated control mechanism at the left rear corner of the printing table, the same being taken substantially along the line 10—10 of Fig. 1;

Fig. 11 is an outer side view of the scraper actuated control mechanism at the left front corner of the printing table, the same being taken along the line 11—11 of Fig. 1;

Fig. 12 is an inner side view of the scraper actuated control mechanism at the left front corner of the printing table, the same being taken substantially along the line 12—12 of Fig. 1;

Fig. 13 is an inner side view of the scraper actuated control mechanism at the right front corner of the printing table, the same being taken substantially along the line 13—13 of Fig. 1;

Fig. 14 is a wiring diagram of the circuit for the scraper control mechanism;

Fig. 15 is a front elevational view of the adjustment mechanism for the front of the stencil screen frame;

Fig. 16 is a top view thereof;

Fig. 17 is a view similar to Fig. 16, but showing the adjustment mechanism turned, and with a portion thereof partly broken away;

Fig. 18 is a view similar to Fig. 16 of the adjustment mechanism for the rear of the stencil screen frame;

Fig. 19 is a rear view of the silk screen printing machine with certain details omitted for the sake of clarity;

Fig. 20 is a left hand side view of the printing table partly broken away to show the construction of the table top and the organization of the speed control for the blanket motor drive;

Fig. 21 is a sectional view through the mechanism for disengageably connecting the blanket hand wheel drive;

Figs. 22 and 23 are sectional views taken substantially along the lines 22—22 and 23—23, respectively, of Fig. 21;

Fig. 24 is a transverse sectional view through one of the blanket reels;

Fig. 25 is a side view of the reel shown in Fig. 24, with portions thereof broken away to illustrate the internal construction;

Fig. 26 is a top plan view of the speed control for the blanket motor drive, said view being taken substantially along the line 26—26 of Fig. 20;

Fig. 27 is a sectional view taken substantially along the line 27—27 of Fig. 26;

Figs. 28, 29, 30 and 31 are progressive schematic views of the operative elements of the speed control for the blanket motor drive;

Fig. 32 is a wiring diagram of the circuit for the blanket motor drive, and

Fig. 33 is a schematic front view of a machine embodying a modified form of our invention.

In general we carry out our invention by providing a silk screen printing machine of the type comprising a printing table to both sides of which reels are supported. One reel serves as a supply reel for an elongated flexible blanket and the other as the blanket take-up reel. The blanket functions as a carrier for a long web of a textile fabric which is to be printed. Printing is achieved through the use of a screen carried on a frame, printing ink being placed on the screen and expressed through pervious portions of the screen by a scraper which moves back and forth between two ends of the screen in a direction transverse to the length of the web. Pursuant to one of the primary features of the present invention, the scraper is power driven.

Said scraper is supported at its ends on trucks which ride along rails extending from the front to the back of the printing table. These trucks are connected to chains alternately driven in opposite directions by a reversible electric motor to move the trucks back and forth. Switch means positioned at the back and front of the printing table reverse the direction of travel of the trucks at the proper point of the forward stroke and deenergize the motor at the proper point of the return stroke while preparing the motor to operate in a reverse direction when next started. Other switch means at the back and front of the machine control mechanisms to check the scraper at the ends of both strokes. In addition the machine includes a scraper controlled mechanism for lifting up the scraper at the ends of both strokes, and for locking said scraper in such raised position at the end of the return stroke.

The electrical circuit and the mechanical arrangement of the parts of the machine is such that the scraper itself controls the various operations in the printing cycle, as for example, the slowing down of the scraper as it nears the ends of both strokes, the reversal of the drive for the chains which reciprocate the trucks, and the raising and lowering of the scraper.

The blanket is moved between successive printing operations (repeats) by the manipulation of hand wheels, and said hand wheels are arranged to be disengaged from the blanket drive when the same is motor driven as, for example, when a web is being applied or being dried. The control for the blanket motor drive operates to move the blanket at a uniform linear rate over the printing table. It should be observed in this regard that the blankets usually are made of a material such as plain linoleum which does not lend itself to a constant speed drive at the printing table but must be driven by turning the take-up reel. Inasmuch as the diameter of the blanket on the take-up reel constantly varies, the mechanism for driving the blanket at a constant linear speed includes means for driving the take-up reel at a variable angular speed inversely proportional to the diameter of the blanket on said reel.

The machine has many other features, a general description of which is not needed at this point to obtain an overall understanding of the machine's basic operation and elements.

General organization (Figs. 1, 2, 19, 20 and 24)

Referring now in detail to the drawings, 40 denotes a silk screen printing machine embodying our invention and comprising a printing table 42 to either side of which a supply or take-up reel 44, 46 is disposed. The printing table 42 includes a front frame 48 and a rear frame 50 interconnected by tie rods 52. Said table is adapted to be secured to a firm support, such as a floor, and is set by means of levelling screws 54 so that the top of the table is approximately horizontal.

The blanket and its front-to-back registering mechanism (Figs. 2, 3 and 19)

The textile web to be printed is adhesively secured to a blanket 56 of flexible material capable of being rolled and rerolled many times without breaking, and yet heavy enough to maintain its own shape when printing pressure is applied thereto. A material which has been found satisfactory for this purpose is heavy commercial linoleum. The blankets are relatively long, for example, seventy-five yards, one end of the blanket being secured by a pressure sensitive adhesive tape to one of the reels and the other end in like manner to the other of the reels. The blanket passes across the table top, being supported there in a manner later described. As the blanket is led from one to the other of the reels its position in a front-to-back sense must be held constant so that successive prints will be in front-to-back registration. Heretofore such registration has been accomplished with guides engaging the edges of the blanket itself. These greatly reduce the effective life of the blanket by wearing and marking its lateral edges or by actually starting tears at said edges. Furthermore, due to the flexibility of the wide blanket, such guides sometimes caused buckling and did not afford accurate registration.

Pursuant to a feature of the present invention, we accomplish such registration by providing narrow guide and spacer belts 58, 60 at the front and back of the blanket adjacent lateral edges thereof. Conveniently, said belts are secured to the undersurface of the blanket, the attachment being effected in any suitable manner, for instance by means of an adhesive, or by mechanical fastening means such as rivets or by sewing. Said belts may be made of the same material as the blanket, i. e., linoleum, or any other flexible and relatively strong substance such as rubber alternatively can be employed.

As the blanket passes from one of the reels to the table and from the table to the other of the reels the belts engage two front-to-back registering means whose construction is best seen in Fig. 3. Each said means includes a double flanged guide sheave 62 mounted to rotate about a horizontal axis extending in a front-to-back direction underneath the blanket. Said sheave snugly receives between its flanges the front guide and spacer belt 58. The sheaves are located in proximate relationship to the printing table one to either side thereof as seen in Fig. 2. For this purpose said sheaves either may be journaled in bearings supported from the table or from the reel carrying cradles, the latter type of support being illustrated herein.

It is convenient to associate said sheaves with idling rollers which carry the weight of the belt as it approaches and leaves the table. Accordingly, each sheave 62 is secured to a shaft 64 which also has mounted thereon an idler roller 66. Said idler roller is of reduced diameter at its rear 68 to accommodate the rear guide and spacer belt 60. The idler roller shaft 64 is journaled at its ends in self-aligning flanged cartridge bearings 70 which are secured to the cradle frames 72 for the supply and take-up reels.

Means also is included for holding the blanket down against each idler roller and guide sheave. Such means comprises a pair of keeper wheels 73 rotatably supported on shafts 74 vertically adjustably bolted to angle brackets 75 fastened to the cradle frames. The front keeper wheel captively holds the front guide and spacer belt 58 between the flanges of the guide sheave 62 and the rear keeper wheel holds the back edge of the blanket against the idler roller and prevents the blanket from skewing when the diameter of the associated reel is so large that the top of the reel is higher than the idler roller.

The scraper

*(Figs. 1, 4 and 5)*

Printing ink is forced through the stencil by an elongated scraper blade 76 comprising a rigid backing member or body 77 whose tip 78 is either rigid or resilient depending upon the particular manner in which the machine is used. The scraper blade 76 illustrated herein is entirely rigid, being composed, by way of example, from a thermosetting plastic. The lower portion of the blade is slightly tapered and the tip 78 thereof rounded as best seen in Fig. 5. The blade has notches 79 at its upper corners to accommodate blade supporting means comprising a pair of clamps 80. Said clamps each include a base plate 82 abutted against an end of the scraper and a pair of spaced flanges 84, 86 integral with the base plate and overlying the front and back of the scraper adjacent an end thereof. Screws 88 pass through registered apertures in the flanges 84, 86 and scraper, being held in place by nuts 89 which thus serve to firmly secure the scraper to the clamps. The scraper apertures just mentioned are vertically elongated to permit vertical adjustment of the blade.

The base plates 82 of both clamps carry outwardly extending pins 90 journaled in vertically elongated slots 92 formed in blade hangers 94. Said plates also support outwardly extending lugs 96 disposed above the pins 90. These lugs are received in large horizontally elongated openings 98 in the blade hangers. The foregoing construction permits the scraper blade to pivot freely about the pin 90 between extreme positions defined by abutment of the lugs 96 against the ends of the openings 98. Said extreme positions preferably are made adjustable by the inclusion of limit stops 100 in the form of headed screws threaded into appropriate apertures at both ends of the openings 98. Each blade hanger includes a collar 102 at its upper end which is slidable on a draw bar 104. To prevent relative rotation of the hangers and draw bar, the draw bar is formed with a keyway 106 and the collars carry keys 108 which are clamped in the keyway by set screws 110.

It will be appreciated that, with the arrangement just described, the scraper blade may be adjusted up or down, the angles to which the blade is tilted at the ends of both strokes may be varied, and the blade can be shifted to the right or left, as desired by the operator.

The machine may be provided with a handle 112 (shown in dot and dash lines in Figs. 1 and 4) which is adapted to be secured in a socket 114 carried by a handle sleeve 116 mounted on the draw bar. The handle is only intended to be used on special occasions, as for example when it is desired to test a screen or when power is not available.

The scraper support

*(Figs. 1, 4, 6 and 11)*

Similar carriage elements support both ends of the draw bar 104, and, accordingly, only one of said elements will be described in detail. Said element includes a gimbal socket 118 in which an end of the draw bar is secured by a round locking pin 120 whose ends are laterally flattened, as by milling. The pin extends through a transverse bore in the draw bar and has its flattened ends disposed in opposed keyhole slots 122 in the gimbal socket. The circular portions of the slots 122 are sufficiently large to pass the full diameter of the pin 120 so that in normal operation, when the pin is remote from the circular portion, the draw bar will be securely locked. This arrangement permits a slight end play of the draw bar which, for purposes of illustration, is exaggerated in the drawings. It may be mentioned that the spacing between the gimbal sockets of the right and left hand carriage elements is such that the draw bar cannot be shifted sufficiently to align either locking pin with the circular portions of the keyhole slots and that, therefore, these pins can only be removed by first dismounting either or both sockets in a manner which will shortly be described.

The outer end of the gimbal socket is formed to the shape of a horizontal trunnion 124 which embraces a pivot block 126 and is rotatably secured thereto by registered pivot pins 127. The upper and lower ends of said pivot block are rotatably held between the arms of a vertical trunnion 128 by an assembly pin 130. Said pin is kept in place by its own weight, being prevented from falling through the pivot block by its head. When the pin is pulled out, the pivot block 126 can be withdrawn from the vertical trunnion 128 thus permitting removal of the scraper.

The vertical trunnion is secured to a slide plate 132 which is in face-to-face sliding engagement with a roller mounting plate 134. The slide plate has the inner surface of its side edges rabbeted to form rails 136 in which the flanges 138 of rollers 140 ride. Four such rollers are provided (Fig. 6), two at either side of the slide plate, these rollers being rotatably mounted on and captively secured to shafts which are bolted to the roller mounting plate 134. The rollers on opposite sides of the slide plate are vertically registered. There is thus provided a carriage which constrains the scraper for free vertical movement within its effective range of operation, and allows the full weight of the scraper and the elements supported thereby to be pressed against the screen. This insures a uniform floating scraper pressure and produces an even print.

Too great a downward movement of the slide plate is checked by a bottom stop pin 142 adapted to abut against the upper edge of the roller mounting plate.

The slide plate carries a lifting and reversing roller 144 whose function will later be apparent.

Means is provided to guide and support the mounting plate in a fashion such that it can be moved back and forth (transversely) across the blanket. Such means comprises a truck 146 bolted to each of the mounting plates. Each said truck has a pair of concave wheels 148 rotatably mounted at its opposite ends. These wheels ride on tubular rails 150 spanning the blanket at opposite sides of the printing table. Said rails are vertically adjustable to permit any play resulting from wear of the wheels or rails to be taken up. The wheels are further guided by a pair of upper rails 152 directly above the lower rails 150.

One truck, as for instance the left hand truck (Fig. 4), carries a brake bar operating roller 154 which is vertically adjustable thereon and whose purpose will be described hereinafter.

The rails 150, 152 are bolted at their opposite ends to brackets 156 which rest on spacers 158 and are fixed to the horizontal apron of angle irons 160. Said angle irons are supported by angle brackets 162 fastened to the front and rear frames 48, 50.

The reciprocating drive (Figs. 1, 4 and 7–13)

Both trucks 146 are driven synchronously back and forth along the rails 150, 152 by like means only one of which will be described in detail. Said means comprises a chain 164 attached at one end to an end of the truck and at its other end to cable 166. Said cable, in turn, is attached to the other end of the truck through a tension take-up 168 (Fig. 6). The cable is trained around a sheave 170 (Figs. 8 and 11) at the front of the machine and the chain is trained around a sprocket 172 (Figs. 7 and 10) at the rear of the machine. The sprocket is mounted on a countershaft 174 driven through a chain and sprockets (Fig. 7) by a synchronous three-phase reversible motor 176 mounted on top of one of the rail brackets 156. Said motor is supplied with power from a suitable source of electrical energy, being connected in a reversing circuit, e. g. a circuit such that, if one phase is reversed, the motor will turn or be prepared to turn in an opposite direction.

The actual reversing of the motor is controlled by the scraper itself, i. e. the scraper (this includes elements movable therewith) in its to and fro travel operates switching elements which cause the reversing circuit to be operated.

To effect the reversing action the upper rail 152 on one side of the machine, e. g. on the right side of the machine, has secured thereto a cam and switch mounting plate 178 (Figs. 1 and 9) located at the rear of the machine, and a similar plate 180 (Figs. 1, 8 and 13) located at the front of the machine. The plate 178 is fastened to the rail 152 by a pair of bolts 182 (Fig. 9) whose shanks freely pass through apertures in the flanged base 184 of said plate and are threaded into a bar 186 nested within the rail. The bolts extend through a long slot 188 in the upper portion of the rail, thus permitting the plate 178 to be adjusted parallel to the scraper travel over a wide range. The plate 180 has a substantially similar mounting as will be seen from inspection of Fig. 13. However, its range of adjustment is considerably more limited, inasmuch as in the operation of the machine it is generally desired to have the front end of the strokes of the scraper near the operator. A slight adjustment of the front end of the scraper stroke, however, may be desirable to accommodate for variations in the sizes of the screens.

Each plate 178, 180 supports an inwardly spaced plate 190 (Fig. 1) at the end of sleeves 192. The plates 190 have mounted thereon momentary snap acting switches, one switch 194 being located at the rear of the machine and the other switch 196 being located at the front of the machine. These switches may be of any type, as for example, a micro switch or a mu switch. The actuating element for each switch lies in the path of travel of the lifting and reversing roller 144 (Fig. 4) so that when said roller encounters one or the other of the reversing switches, it will change the electric supply circuit for the motor 176 in such fashion that the motor will either be reversed or be prepared to be driven in opposite direction.

In the actual electrical circuit shown in Fig. 14, and hereinafter described at length, when the roller actuates the front reversing switch 196, the motor will be immediately reversed and the trucks caused to be moved rearwardly. When the roller actuates the rear reversing switch 194, however, the motor will merely be prepared for reversal and will not actually drive the trucks in opposite direction until a starting button is manipulated.

The actuating elements for each of the switches comprises a roller 198 mounted on the tip of an arm 200 which is secured to a shaft 202 extending from the switch, the switch being of the type which is operated by turning said shaft. It may be pointed out at this time that the switch roller 198 is lower than the reversing roller 144 when the latter is moving through that portion of its path over which the scraper is effective. But, at both ends of its path the scraper is lifted to clear the color well. Such action raises the reversing roller and it is for this reason that the switch rollers 198 are in elevated position. It should also be noted that the electrical circuit for controlling the operation of the motor is such that the switches 194, 196 need not be maintained in actuated condition but have only to be momentarily operated in order for the motor to reverse, electric means being provided to maintain the circuit in any given condition until an opposite movement of the motor is required.

With an arrangement such as that just described, the scraper controls its own reversal. This enables the machine to be very easily changed over from one to another size of stencil, it being merely necessary to shift the plates 178, 180 to a new position on the rail 154. As will later be better appreciated, this same shifting of the plates also varies the position of the other mechanisms normally operated at or near the end of a forward or return stroke of the scraper.

The scraper raising and lowering mechanism (Figs. 1, 4 and 7–13)

As the scraper sweeps back and forth across a stencil it pushes in front of it a pool of printing ink. When the scraper approaches an end of the stencil and is about to reverse it is necessary for the scraper to be raised up in the air and to descend on the screen at the opposite side of the pool. Heretofore this operation has been accomplished on hand-operated machines by raising the scraper manually at the desired points of its operation.

Pursuant to a feature of this invention a highly simplified means is incorporated to carry out the aforesaid operation mechanically, that is, to raise the scraper as it nears each end of the stroke and then to abruptly lower the scraper as it starts moving in the reverse direction so that the scraper will clear the pool of printing ink (known in the trade as the "color well"). Part of this means resides in the construction of the scraper support and consists in so forming the support that the scraper is free to move vertically. The raising and lowering means further includes a set of cams or the like for engaging the rollers 144 at the two ends of the scraper stroke in such manner as to first lift and then lower the same. One such set of cams is provided on each of the plates 178, 180 already mentioned and on similar plates 204, 206 (Figs. 1, 10, 11 and 12) located at the back and front of the machine on the left side.

All of the cams are identical and it will suffice, therefore, to understand the construction and operation of only one of them, for example, the set of cams at the right rear corner of the machine, these cams being best seen in Fig. 9. Said cams comprise a lifting cam 208 and a lowering finger 210 which, when the scraper is moving to or fro but is not at an end of a stroke, occupy the positions shown in full lines in said figure.

The lifting cam 208 includes a base 212 which is pivoted on a pin 214 extending from the cam mounting plate 178. Said base has an inclined shelf 216 which forms the active element of the lifting cam. This shelf rises rearwardly and upwardly, and at its leading lower (front) end is at approximately the level of the lifting roller 144 as the squeegee is pressing against a screen. The elevation of the trailing (rear) end of the shelf is sufficiently high to lift the roller 144, and with it the scraper, to an extent sufficient to raise the scraper clear of a screen. The height of the lower end of the shelf may be adjusted by turning a limit stop 218 upon which the base of the lifting cam rests.

As the lifting roller 144 leaves the trailing end of the shelf 216 is moves on to the horizontal lowering finger 210 which is secured to a shaft 220 journaled in the cam plate 178 and projecting to both sides thereof. The portion of the shaft projecting inwardly of the plate 178 carries the lowering finger. The other end of the shaft has secured thereto a radius arm 222 (Fig. 7) which is biased by a tension spring 224 in a direction such as to urge the lowering finger to its idle horizontal position. An abutment 226 for the radius arm is provided to determine this idle position of said finger. The spring 224 is anchored at its stationary end to a bolt 228 slidably adjustable in a slot 230 in the cam plate whereby to permit variations to be made in the tension of said spring. This tension is so adjusted that when the rollers 144 pass on to the lowering fingers from the shelves 216, said fingers will momentarily support the weight of the vertically movable parts of the scraper but will very quickly thereafter drop to allow the scraper to reengage the stencil screen. The lowering position of the finger is illustrated by dash-and-dot lines.

In the operation of this part of the machine, the rollers as they ascend the shelves will cause the scraper to be lifted clear of and travel over the color wells, and as soon as the rollers ride on to the lowering fingers the scraper will be lowered, and the lowering will be cushioned because of the checking influence of the springs 224. It also will be seen that while the rollers are located on the lowering fingers they will engage the operating elements for the reversing switches 194, 196. When the scraper is reversed the rollers 144 will return beneath the shelves 216 at the lower level and swing said shelves out of the way to the dash-and-dot position indicated in the several figures.

In normal operation of the machine, the scraper starts from the rear of the machine when the operator actuates a starting button or the like, moves to the front of the machine, automatically reverses at the front and then moves back again to the rear of the machine where it is desired to have the scraper automatically come to a stop so that the stencil frame can be raised and the blanket and web advanced. However, this necessitates holding the scraper in raised position when it is at the rear of the machine or else its weight will deform or break the screen.

A latching means, therefore, is provided for keeping the scraper raised when the same is at the rear of the machine and on the lowering fingers 210. Said latching means comprises a bolt 231 (Figs. 7 and 10) vertically reciprocal in a bracket 232. The upper end of the bolt is fashioned into a yoke 234, the tips of whose arms are spanned by a roller 236 which rests upon a rocker arm 238 fulcrumed on a pin 239 carried by the rear bracket 178. Said arm is biased by a spring 240 to an idle position in which the bolt 230 has dropped so far that the bottom of the yoke 234 rests on the bracket 232. The arm 238 is turned in the opposite direction by the armature 242 of an electromagnet 244. When the bolt is in its lowermost position, the bottom end thereof projecting beneath the bracket is so located as to dispose said end in the forward path of travel of the radius arm 222.

Thus, as long as the electromagnet is deenergized, the lowering finger will be locked in its horizontal position. Two latching means are provided, one at each of the rear corners on the mounting plates 178 and 204. No latching means is employed at the front of the machine, inasmuch as the lowering fingers there are intended to always automatically lower the scraper as its direction of travel is reversed.

It may be pointed out here that, when the scraper is set down by the lowering fingers, the finger on one side of the machine may lower the associated end of the scraper in advance of the finger on the other side of the machine and, due to the considerable weight imposed upon the scraper, this might cause one corner of the scraper to dig through the silk screen. This is prevented by the presence of the slots 92 heretofore described which allow the scraper blade to move relative to the scraper support when said blade first rests on the screen as the lowering fingers become effective. Said slots, however, are relatively short, so that during an actual scraping stroke the upper ends of the slots bear against both pins 90.

*The scraper braking and buffing mechanism*

(Figs. 1 and 7–13)

The rate of production of the machine fundamentally depends upon how fast the scraper moves to and fro. Therefore, the driving train between the motor 176 and countershaft 174 is so designed as to obtain a high speed of travel for the scraper. However, because of such high speed, the scraper cannot be allowed to drift to a stop but must be positively checked at each end of its stroke. Furthermore the checking action must be fast and only effective at the very ends of the stroke; that is to say, if the checking is effective a considerable distance from the end of the stroke, the construction of the checking means will be considerably simplified but the speed of the machine will be appreciably reduced and, due to the change of speed of the scraper over the printing surface of the screen, a difference in color tone would be noticeable in the printed web. Therefore, pursuant to a feature of the invention, the checking means is so arranged that it becomes effective the shortest possible time before the scraper reaches an end of a stroke.

In general this is accomplished by employing a brake which is rendered operative some distance before the scraper reaches an end of a stroke, but while the motor 176 is still running, so that the scraper is actually being driven at top speed while the brake is on. With such arrangement the brakes will be immediately effective the instant the motor is cut off and, as will be recalled, the source of power to the motor is broken at a point barely before the scraper is at the end of a stroke.

Any suitable type of brake may be employed, as for example, a dynamic or an electromagnetic brake, the latter type being the one illustrated herein. The brake conveniently is applied to the countershaft 174 and may be of any conventional type comprising, by way of example, a brake drum 246 (Fig. 10) fixed to the countershaft and rotating between a pair of brake shoes 248. Each shoe is pivotally secured to an erect brake arm 250 rotatable on a base plate 252 which is rigidly attached to the bracket 156 at the left rear corner of the machine. The two brake arms are joined by a rod 254 pivoted at 256 to the forward brake arm near its upper end and slidable in an aperture near the upper end of the rear brake arm 250. The backwardly extending end of the rod 254 carries an abutment washer 258 against which one end of a compression spring 260 bears. The other end of said spring is seated in a notch in the rear brake arm 250. Said spring thus serves to urge together the two brake arms and forces the two brake shoes 248 against the brake drum 246.

A pair of brake levers 262 are pivoted at 263 to a bracket 264 on the rear brake arm 250. Said levers also are pivotally connected at 265 to a block 266 adjustable along the brake rod 254. With this arrangement, if the far ends 268 of the brake levers 262 are depressed, the arms 250 will be spread apart thereby releasing the pressure of the brake shoes on the brake drum.

To this end the far ends of the brake levers are rotatably secured to a link 270 which is pivotally connected to the armature 272 of a normally energized brake electromagnet 274. The circuit of said magnet is controlled by either one of a pair of normally closed momentary snap acting switches 276, 278, the first of which is mounted on the rear left-hand plate 204 (Fig. 10) and the other of which is mounted on the front left-hand plate 206 (Fig. 11). The actuating element for each of said switches constitutes a depending finger 280 which presses against the upper edge of a brake bar 282 fulcrumed on a screw 284 attached to the plate 204 or 206. Said bars are constrained against sidewise movement by guides 286 having vertical slots 288 adapted to receive pins 290 extending from the bars.

The brake bars are urged by gravity, and by the usual biasing means within the switches 276, 278, to their idle position defined by abutment of the pins 290 against the lower ends of the slots 288. Such idle position is illustrated in Fig. 10. In this position the brake bars lie in the path of travel of the roller 154 carried by the left-hand truck 146. As the truck approaches the end of a stroke, the roller 154 will engage the sloped tip of a brake bar and force the same upwardly to the position indicated in solid lines in Fig. 11. This will actuate the associated brake switch, opening its contacts to deenergize the solenoid of the electromagnet 274 and allow the spring 260 to set the brake. It will be observed that, pursuant to the above described mode of operation, the brake is cut in while the motor is still driving the trucks at full speed, that is to say, a brake bar will be actuated by the roller 154 before either reversing switch 194, 196 is encountered by the roller 144.

Because the scraper is travelling so rapidly, there is a tendency for an abrupt stoppage thereof to create an impact stress in the machine, and the brakes may therefore be so designed that they cannot quite stop the carriage in the short distance after a switch 194, 196 is actuated. To supplement the checking action of the brakes, a buffing means is provided, said means serving to cushion the stopping shock. Any well known type of buffer can be employed, as for example, a spring loaded pneumatic buffer such as shown in conjunction with the machine herein. Said buffer simply comprises a cylinder 292, strapped to each bracket 156 at the front and rear of the machine. The cylinder houses a reciprocating piston (not shown) to which there is connected a plunger 294. Said piston is spring loaded to the extended position of the plunger and has the usual valve arrangement which only permits a slow escape of air from beneath the piston when the plunger is pressed into the cylinder. The several plungers are adapted to engage the lower arms of the vertical trunnions 128 for the pivot block as the scraper approaches the end of a stroke, the engagement commencing at approximately the position of the carriage indicated in Fig. 11, that is, at just about the time the brake is applied but before the motor stops.

*The scraper electrical control circuit*

(Fig. 14)

A suitable electrical circuit is provided for the several electrically controlled and electric controlling elements heretofore described in connection with the scraper operations in order to carry out said operations in the manner set forth. Said circuit is illustrated in Fig. 14, wherein the sundry mechanical parts are schematically represented and are denoted by the same reference numerals as those previously used. The machine derives electric power from the three-phase busses 296, 298, 300, only one phase 296—298 of which is employed for the various control circuits. Normally the machine is idle, that is, the scraper is at rest on the locked rear lowering fingers 210.

The machine is started by manipulating a momentary starting switch 302 (see also Fig. 2) having normally open contacts 303. Actuation of said switch is designed to energize the solenoid 304 of a forward operating motor relay 306 which controls four normally open sets of contacts 308, 310, 312 and 314. The energizing circuit for the solenoid 304 extends from the bus 296 to the bus 298 running through a wire 316, the momentarily closed contacts 303 of the starting switch, a wire 318, a set of normally open contacts 320 of the rear reversing momentary switch 194 (see also Fig. 9), which, however, are now closed because the scraper is at the rear of the machine, a wire 322, the solenoid 304, a wire 324, a set of normally closed contacts 326 of the front reversing momentary switch 196 (see also Fig. 8), a wire 328 and a set of normally closed contacts 330 of an emergency momentary stop switch 332 (see also Fig. 2). As soon as the solenoid 304 is energized it draws up and closes all its associated contacts.

Closing the contact 308 completes a holding or stick circuit for the forward operating relay 306 as follows: from the bus 296 through a wire 334, closed contacts 308, a wire 336, the wire 332, the solenoid 304, the wire 324, the normally closed contacts 326, the wire 328 and the normally closed contacts 330 to line 298 so that when the switch 302 is released the relay 306 will remain energized.

Closing the contacts 310, 312, 314 connects the bus 296 to a motor terminal 338 through the contacts 310 and wires 334, 340; the bus 298 to a motor terminal 342 through contacts 314 and wires 343, 344; and the bus 300 to a motor terminal 346 through contacts 312 and wires 347, 348. The connections are such as to turn the motor over in a proper direction to move the scraper toward the front of the machine. The field 350 of the motor is energized throughout an entire working day, the conventional connections therefor being omitted to simplify the drawings. It will thus be seen that, as soon as the switch 302 is manipulated, the motor will start to move the scraper from the back to the front of the machine and the scraper will continue to move even after manual pressure has been released from said switch.

Actuating the starting switch 302 also withdraws the bolts 230 (see also Figs. 7 and 10) which lock the rear lowering fingers 210 in horizontal position. As will be recalled, said bolts are controlled by the electromagnets 244 of which only one is shown in the circuit. Actually said magnets are connected in parallel and the solenoid 352 of each is energized in the following manner when the switch 302 is pressed: from the bus 296 through the wire 316, the momentarily closed contacts 303 of the switch 302, a wire 354, the solenoid 352 and a wire 356 to the bus 298. It is pointed out that the solenoid 352 acts fast enough to release the lowering fingers 210 before the motor has driven the scraper forward enough to leave said finger.

When the motor is energized, wires 357, 358 which supply power to a solenoid 360 of the brake electromagnet 274 immediately have potential applied thereto. At the time of starting the brake bar operating roller 154 is in engagement with the rear brake bar 282 (see also Fig. 10) so that a set of normally closed contacts 362 of the rear brake momentary switch 276 are open and the brake drum 246 therefore is engaged by the brake shoes 248. However, the motor 176 has ample power to start the scraper up and almost instantaneously bring it to full operating speed, even with the brake set. As soon as the scraper has run a short distance the roller 154 will clear the brake arm, permitting the contacts 362 to close and energize the solenoid 360 of the brake electromagnet whereby the scraper will run free for the major portion of its travel.

As the scraper nears the front of the machine, the roller 154 will lift the brake bar 282 (see also Fig. 11) at the front left-hand side of the machine whereby to open a set of normally closed contacts 363 of the momentary switch 278. This will de-energize the brake solenoid 360 and allow the brake to set while the scraper still is being driven forwardly.

Further forward movement of the scraper causes engagement of the reversing roller 144 and the roller 198 of the front reversing momentary switch 196. Actuation of this switch operates two sets of contacts, opening one set of contacts 326, already mentioned, which are normally closed, and closing another set of contacts 364 which are normally open. Opening the contacts 326 breaks the holding circuit, above described, for the solenoid 304 of the forward operating motor relay 306. This in turn opens the forward energizing circuit for the motor 176 through the contacts 310, 312, 314.

Closing the contacts 364 completes an energizing circuit for the solenoid 366 of a reverse operating motor relay 368. This circuit runs from the bus 296 through a wire 369, the momentarily closed contacts 364, a wire 370, the solenoid 366, a wire 372, a set of normally closed contacts 374 of the rear reversing momentary switch 194, a wire 376 and the normally closed contacts 330 of the emergency stop switch to the bus 298.

The reverse operating relay controls four pairs of normally open contacts 380, 382, 384, 386. The first pair of contacts 380 functions as the holding means for the reverse relay 368. When these contacts 380 are closed, a stick circuit is energized for the solenoid 366. Said circuit extends from the bus 296 through a wire 388, the contacts 380, a wire 390, the solenoid 366, the wire 372, the normally closed contacts 374, the wire 376 and the normally closed contacts 330 to the bus 298.

Closing the contacts 382, 384, 386 will reverse one phase of the power supply to three-phase motor 176, that is to say, the bus 300 will still be connected to motor terminal 346, although through contacts 384 of the reverse operating relay rather than through contacts 312 of the forward operating relay. However, the bus 296 instead of being connected to motor terminal 338 now will be connected to motor terminal 342 through contacts 382 of the reverse operating relay, and the bus 298 instead of being connected to motor terminal 342 will be connected to motor terminal 338 through contacts 386 of the reverse operating relay.

Although the reversal of the motor is substantially instantaneous, the scraper does not reverse the moment the reversing roller 144 contacts the switch roller 198, inasmuch as the scraper has an appreciable momentum. But the brake and buffer will no longer be operating against the motor and so are able quickly to bring the scraper to a stop. In the machine illustrated this is done over a distance of about three-quarters of an inch, or very shortly after the motor is connected for reverse operation. Slight variations in this distance can be compensated for by adjusting the position of the switch 196, this being effected by securing said switch to its mounting plate 190 with screws 391 (Fig. 13) passing through horizontal slots in said plates. The position of said switch should be so set that as the scraper actually reverses the rollers 144 will be on the lowering fingers 210.

Thus, as soon as the carriage is stopped at the front of the machine, it will immediately start to travel in the opposite direction, the load on the motor being somewhat reduced by the impelling action of the buffer as it releases its stored energy. The carriage is started in the reverse direction while the brakes are still applied, the drag of the brake not being sufficiently large to overload the motor and this drag being in part overcome by the release of energy from the buffer.

As soon as the scraper has moved a short distance rearwardly, the roller 154 will ride off the brake bar 282, thereby permitting the contacts 363 of the momentary switch 278 to reclose so that the solenoid 360 of the brake electromagnet 274 will reenergize and release the brake. This allows the motor 176 now to freely drive the scraper back toward the rear of the machine.

When the scraper approaches the rear of the machine, first the roller 154 will actuate the momentary switch 276 through the brake bar 282 to apply the brake. Then the roller 144 will engage the roller 198 of momentary switch 194. This will open contacts 374 to break the stick circuit for the operating solenoid 366 of the reverse operating motor relay 368. Since at such time the contacts 303 of the starting switch are open, the forward operating motor relay 306 likewise will be idle so that the motor will be stopped and the brake and buffers will bring the scraper to a dead stop as the rollers 144 rest upon the latched lowering fingers 210. The machine now is ready to start another cycle.

*The stencil screen and its support*

(Figs. 1, 4, 7-13 and 15-18)

The scraper during its operation sweeps over and presses against the upper surface of a conventional screen 392 of the type generally known in the art as a "silk" screen, the same constituting a piece of fabric which has pervious and impervious areas defining a design. The screen ordinarily is of oblong shape being elongated in a front-to-back direction. The edges of the screen are secured in a suitable manner, as by gluing, clamping or stapling, to a stencil screen frame 394 of any self-form-maintaining material, such for example as wood, whose undersurface has a slight upward and outward rake $a$ (Figs. 4 and 7) the purpose whereof will soon be pointed out. When the scraper is functioning, the stencil screen rests on a textile web 395 carried by the blanket 56. However, when the scraper is idle and it is desired to shift the blanket in order to bring a fresh portion of the web beneath the screen, the screen must be elevated.

For this, there is provided a sub-frame which also serves as a means for holding the stencil screen in proper position during printing. The sub-frame comprises a pair of angle irons 396, 398 (Fig. 1) at the front and rear of the machine respectively, the horizontal flanges of said irons extending inwardly toward the screen and being disposed under the front and back members of the frame 394. Said angle irons are interconnected by front-to-back tie rods 400 slidably fitted in collars 402 at both ends of the two angle irons 396, 398, the tie rods being secured to the irons by set screws 404 (Figs. 1, 7 and 8). This arrangement permits the angle irons to be adjustably positioned and thus to hold screens of different lengths. The rear ends of the tie rods have integral aligned rings 406 (Figs. 1 and 9) formed thereon; and the same are journalled on shoulder screws 408 secured to the brackets 156 at the back of the machine so that the sub-frame can be swung about a horizontal axis at the back of the machine. When the sub-frame is raised by oscillation about said axis, the horizontal flanges of the angle irons 396, 398 will engage the under-surface of the front and back members of the stencil screen frame 394 causing said frame to be swung up clear of the textile web. It is pointed out that in printing position the rake $a$ allows said horizontal flanges to become disengaged from the stencil screen frame so that the weight of said frame entirely rests upon the textile web 395.

Although the sub-frame, stencil and stencil frame are not very heavy, and the sub-frame easily can be raised by manually lifting the front angle iron 396, the operator at such time has other duties to perform and manipulation of the machine therefore will be expedited if the weight of the sub-frame and elements carried thereby is counterbalanced whereby once the screen is raised it will remain raised until deliberately lowered. To this end, the undersurface of the front angle iron 396 rests upon a roller 410 (Figs. 8 and 13) journalled at the upper end of a vertical rod 412 slidable in a vertical bore 414 formed in the front frame 48 of the printing table. Said roller rides in a front-to-back slot 416 formed on a block 418 integrally secured to the undersurface of the angle iron 396.

The lower end of rod 412 carries a hardened steel plate 420 which bears against a roller 422 journaled on one end of a rocking lever 424 whose other end adjustably supports a counterpoise weight 426. The rocking lever is pivotally attached intermediate its ends to a bracket 428 fixed to the front frame of the printing table.

With this arrangement, the counterbalancing moment afforded by the counterpoise weight is at a maximum when the rocking lever 424 is at right angles to the rod 412. Inasmuch as the said rod is vertical, the horizontal position of the rocking lever will provide the highest counterbalancing moment. That is to say, when the counterpoise weight is above the horizontal plane passing through the fulcrum of lever 424, a lesser counterbalancing moment will be exerted than when said weight is in the plane of its fulcrum.

The fulcrum point of the rocking lever is so disposed relative to the plate 420 that when the stencil screen is in printing position the rocking lever 424 will have the end thereof on which the counterpoise weight is mounted disposed in the tilted position illustrated in Fig. 8 wherein said weight is above the horizontal plane of the fulcrum of said lever. Said counterpoise weight is so adjusted that it will counterbalance the weight of the sub-frame, the stencil screen frame and the stencil at such time as the stencil is in its elevated or non-printing position.

It will be seen that, with this construction, lowering of the stencil screen will reduce the counterbalancing moment so that when the stencil screen is in printing position it will not be raised by the counterpoise weight. Thus an operator may take her hands off of the subframe when she has either raised or lowered the stencil, and the stencil will remain in either position.

If desired, a rubber sleeve 420$a$ may be carried on the rod 412 to cushion the impact of the plate 420 against the front frame of the machine in case the stencil is raised too rapidly.

To prevent the counterpoise from lifting the sub-frame away from a horizontal position when the stencil and stencil frame are removed and the machine is operated for purposes other than printing, means may be provided to render the counterpoise ineffective. Such means includes a horizontal hole 429 in the front of the vertical rod 412 which is adapted to slidably receive the free end of a rod 430. This rod is rotatably and slidably secured in a ferrule 431 threaded into the front frame 48. Said rod carries a collar 432 which operates in a bore 433 in back of the ferrule 431. A spring 434, encircling the portion of the rod in said bore, is seated against the collar 432 and biases the rod toward the shaft 412.

The forward end of the rod carries a transverse pin 435 both of whose ends project beyond the rod. These ends of the pin are adapted to be seated either in a pair of diametrically opposed shallow notches 436 or another diametrically opposed pair of notches 436$a$ which are deeper than the notches 436 and are disposed 90° away therefrom. All said notches 436, 436$a$ are located in the forward edge of the ferrule 431. The pin includes an operating handle 437 which is knurled, as indicated, to facilitate manipulation thereof.

During normal operation of the machine, the pin 435 has its ends disposed in the notches 436, and in this position the tip of the rod 430 is held clear of the vertical rod 412. If it is desired to operate the machine with the subframe down when the stencil is removed, the handle 437 is pulled out sufficiently to permit the pin 435 to slide out of the notches 436. Thereupon said handle is rotated 90° and released. This will line up the pin 435 with the deep notches 436a so that the tip of the rod 430 can press against the vertical rod 412 under the influence of the spring 434. Now, if the subframe is lowered by hand, the rod 430 will snap into the hole 429 to detain the vertical rod 412 in depressed position.

As already indicated, the subframe is employed to register the stencil. For this purpose the subframe is provided with a registering means of a simple, unique construction. Said registering means includes both a front adjustment 438 (Figs. 13 and 15–17) and a rear adjustment 440 (Figs. 9 and 18).

The front adjustment 438 comprises a vertical slot 442 formed in the upright flange of the front subframe angle iron 396. This slot snugly receives a locating pin 444 having integral locking collars 446 at the front and rear thereof slidably bearing on the forward and back surfaces of said upright flange. Said locking collars function to prevent axial shifting of the locating pin 444. An offset arm 448 integrally connects the rear locking collar with a split bearing 450 which is eccentric with respect to the axis of said pin. At the split, the juxtaposed edges of said bearing are provided with apertured lugs 452, one of which is tapped to receive a clamping bolt 454 freely passing through the aperture in the other lug. The split bearing has journaled therein a mounting pin 456 integral with a plate 458 which is secured to the front member of the stencil frame 394 in some rigid manner as for instance with wood screws 460 (Fig. 13). Optionally, the plate 458 may have a centering pin 462 received in a mating aperture in the front of the stencil frame to aid in fixing the location of the mounting pin 456 which is intended to be a permanent part of the frame.

The rear adjustment 440 includes a similar mounting pin 464 secured to the rear member of the stencil frame. The pin 464 is journaled in a split bearing 466 integral and eccentrically disposed with respect to a rear locating pin 468. Said locating pin is slidable in a vertical slot 470 formed in the erect flange of the rear subframe angle iron 398. Attention is called to the fact that the rear locating pin 468 has only an inside collar 472 and not a pair of collars such as the front locating pin.

The stencil screen is adjusted from side to side by loosening the clamp bolts 454 in the front and rear adjustments 438, 440 and turning the locating pins 444, 468 until the stencil is in the desired position. Rotation of the front pin 444 is facilitated by knurling 473 on the front locking collar 446; and rotation of the rear locating pin 468 is similarly facilitated by knurling 474 on the collar 472.

The stencil may be adjusted front-to-back by shifting the same in the desired direction while the bolts 454 are loose, the eccentric bearings 450, 466 being long enough for this purpose. It is pointed out that adjusting the stencil screen from side-to-side does not raise or lower said screen despite the eccentric disposition of the bearings 450, 466 inasmuch as the slots 442, 470 are so deep that they are unable to provide vertical support for the front and back locating pins 444, 468. Thus, regardless of what the adjustment may be, the stencil screen will always rest upon the textile web being printed when the machine is in operation.

It may be mentioned that the relative axial and rotary movement of the eccentric bearing and pins contained therein may be expedited for purposes of adjustment by threading said pins and tapping said bearings.

*The blanket support*

(Figs. 1, 7, 8, 20, 24 and 25)

The opposite ends of the blanket 56 are detachably secured, as with pressure sensitive adhesive tape, to reels 476, 478 (Figs. 1, 24 and 25) one of which may serve as the supply reel and the other as the take-up reel depending upon the direction of blanket travel. Each reel consists of a hollow reel barrel 480 having lateral flanges 482 which support a reel shaft 484 journaled in self-aligning flanged cartridge bearings 486 which are carried by the cradle frames 72. Said frames are held off the floor by levelling screws 488.

As the blanket passes over the printing table it rests upon a substantially flat resilient support such as is afforded by a thick felt pad 490 which in turn is supported on a metal plate 492. Pursuant to ancillary features of the present invention, said plate may be vertically adjusted at many points throughout its area so as to provide the proper type of support for securing a clear and even print over the entire area of the screen. This adjustment is effected by a plurality of tapped sockets 494 held to the underside of the plate 492 by flathead bolts 496 (Fig. 8) received in countersunk holes in the plate. Each socket fixedly engages, e. g. by welding, a depending threaded rod 498 which freely passes through an opening in the horizontal flange of a channel iron 500 (Figs. 8 and 20) running from the front to the back frame of the printing table. Several such channel irons are provided, the same being spaced from side-to-side of the printing table and each having many threaded rods 498 passing therethrough. The rods are vertically adjusted with respect to the channel irons by nuts 502; that is to say, by turning one of the nuts 502 the associated socket 494 will be raised or lowered and the elevation of the plate at that point correspondingly changed. Lock nuts 504 may be threaded on rods 498 underneath the channel irons.

Similarly adjustable types of supports can be afforded for the guide belts 58, 60. Each of these supports comprises a wooden strip 506 running from side-to-side of the machine directly beneath one of the belts. The strips are supported from the channel irons 500 by collars 507 secured to bolts whose heads are received in countersunk holes in the strips and whose shanks are connected to the channel irons in the same manner as the rods 498.

*Manual drive for the blanket*

(Figs. 1, 2 and 19–24)

The supply and take-up reel may be turned over either by hand or by motor.

The hand drive is performed with a pair of hand wheels 508 (Figs. 2 and 20) mounted on hand wheel shafts 510 journaled in the front and back frames 48, 50 of the printing table. Each shaft is kinematically connected to a different reel, the connections being similar for the two shafts. For instance, the left-hand shaft has a sprocket 512 (Figs. 19 and 20) fixed to its rear end. Said sprocket engages a chain 514 trained over a sprocket 516 journaled on the cradle frame 72 and mounted to rotate with a sprocket 518 driving a chain 520. This latter chain is trained around a sprocket 522 (Figs. 19 and 25) fixed to the reel shaft 484.

It will thus be apparent that one of the hand wheels, if turned in the proper direction, will cause its associated reel to pull the blanket over the printing table 42 from the other reel. If desired, while one hand is being used to drive one of the reels, the other hand may be used as a check on the other hand wheel to prevent the same from being overdriven through the blanket. This will impart a slight tension to the portion of the blanket on the printing table. After a print is made through the stencil, the blanket is advanced two frames so that on the forward pass of the blanket every other frame is printed. On the return pass the omitted frames are printed. The blanket is advanced the proper amount by means of the hand wheels and is set in predetermined position by lining up marks (not shown) on the blanket with an indexing mark (likewise not shown) on the front printing frame.

When the blanket is powerdriven there is danger that, if the hand wheels are turned thereby, an operator's hands, clothing or hair may be caught. To prevent this, the machine includes means to selectively connect the hand wheels to the reel shafts for rotation therewith. Said means is best shown in Figs. 1 and 20–23 where it will be seen to comprise a hub 523 integral with the hand wheel and journaled on the front end 524 of the shaft 510. A split washer 526, bolted to the back of the hub and having its inner periphery received in an annular groove 528 on the shaft, serves as a keeper to prevent axial movement of the hub relative to the handwheel shaft while permitting said hub to rotate with respect to said shaft. The forward tip of the handwheel shaft is formed with a pair of diametrically opposite longitudinal slots 530 in which keys 532 are fixed. These keys slide in grooves 534 formed in an axially reciprocating plunger 536 slidable in a well 538 in the hub surrounding the front tip of the shaft. The plunger is bored to slidably receive said shaft so that it will now be seen that the plunger can reciprocate axially of the shaft but is keyed to the shaft for rotation therewith.

The plunger is shifted by means of a knob 540 pinned to one end of a detent shaft 542 whose other end is fixed to the plunger by set screws 543. Said shaft is slidable in a passageway 544 in a cap 546 bolted to the front of the hand wheel hub, said cap serving to limit outward movement of the plunger. The plunger carries a diametrically elongated ridge 548 and the cap is formed with a mating diametric slot 550. When said ridge is in the slot the plunger and cap will be locked for mutual rotation, thus causing handwheel shaft 510 to turn with the handwheel. When the ridge is out of the slot rotation of the reel shaft will not spin the handwheel. Thus, pushing the knob in will disengage the ridge and slot, while pulling the knob out will couple said ridge and slot when the handwheel and handwheel shaft are in the proper relative angular position.

It is desirable to include means for maintaining the knob in either coupled or uncoupled position. Said means comprises a pair of annular grooves 552 on the detent shaft 542. These grooves are spaced axially of said shaft a distance equal to the desired movement of the plunger. The cap carries a detent pin 554 urged toward the detent shaft by compression spring 556 and adapted to be selectively received in one or the other of the grooves 552.

*The power drive for the blanket*

(Figs. 19, 20, 24 and 26)

After a textile web has been fully printed with a color, it is desirable to move it back and forth between the two reels for drying. Pursuant to the present invention, such movement of the web, and more particularly of the blanket on which the web is supported, is effected by means of a motor 558 mounted on cross channel irons 560 supported by the tie rods 52. Said motor operates a speed reduction drive 564 whose output shaft 566 carries two sprockets 568, 570. One of the sprockets e. g. the inner sprocket 568 is adapted to drive one of the reels e. g. the right hand reel 478 and the other sprocket is adapted to drive the other reel 476. The connections between said sprockets and their associated reels are identical, so that only one will be described by way of example.

The sprocket 570 engages a chain 572 trained about a sprocket 574 keyed to a sleeve 576 revolvable on the left hand wheel shaft 510. Said sleeve also carries the rear half 578 of a clutch whose forward half 580 is splined on said left hand handwheel shaft. The clutch is of standard construction, being such that if the forward half thereof is moved toward the rear half the clutch will transmit power and if the forward half is moved away from the rear half the two halves of the clutch will be uncoupled.

This movement of the forward half is accomplished by forming said half with a pair of spaced collars between which rollers the forked end 582 of a bell crank lever ride. The other end 584 of said lever is connected by a link 586 to the armature 588 of a solenoid 590. Said armature is urged to extended position by a spring 592, whereby, when the solenoid is deenergized, the clutch will be uncoupled. Under normal conditions, the solenoid is not energized so that the two handwheel shafts may be operated independently of the motor 558. However, when one or the other of the clutches 578—580 are coupled, said motor will drive either the right hand or left hand reel.

*Uniform speed control for the power blanket drive*

(Figs. 19, 20, 24 and 26–31)

The power drive for the blanket is primarily employed for three purposes, to wit: to actuate the blanket during drying, to actuate the blanket during application of a web and to actuate the blanket during stripping or removal of the web. Under any one of these conditions, it is highly desirable to have the blanket advanced at a uniform speed regardless of the diameter of the blanket on the take-up reel. Means, therefore, is provided to control the speed at which said take-up reel is turned in inverse proportion to the diameter of the blanket on said reel; that is to say, the machine includes means to rotate the take-up reel slower as the diameter of the blanket thereon increases. Said means basically includes a sensing element associated with each reel and responsive to the diameter of the blanket thereon, and a mechanism controlled by the position of the sensing element on the reel, which at the time is operating as a take-up reel, to vary the speed ratio of the reduction drive 564.

The means for controlling the blanket motor drive so as to obtain a constant blanket speed comprises a master caliper arm 594 associated with each of the reels. Each caliper arm is rotatably mounted on a bracket 596 supported by the cradle frame 72. The axis of rotation of said arm preferably is parallel to the reel shaft 484 and is so located with respect to the reel and the arm is of such length, that one end of the arm will always be above the center of the reel shaft. This end of the arm carries a roller 598 which is urged against the reeled blanket by a tension spring 600. The point of engagement between the roller and reeled blanket is above the center of the reel so that the blanket at said point is relatively compact. Thus, the angular position of the caliper arm is a function of the diameter of the outermost turn of the blanket on the reel.

Each master caliper arm is adjustably and pivotally connected to a turnbuckle 602 (Fig. 19) attached to one end of a push rod 604 whose other end is pivotally connected by another turnbuckle 606 to a radius arm 608 fixed on a countershaft 610 (Fig. 20). Said shaft is journaled in a sleeve 612 and carries a swinging lever 614 located adjacent a means 616 for varying the speed ratio of the reduction drive 564.

Since both caliper arms have the same linkage system as that just described, there will be two swinging levers 614 adjacent said speed varying means, one to each side thereof. For convenience, these levers will be denoted as the swinging levers 614R and 614L, the lever 614R being that controlled by the right hand reel (the reel which is at the right hand of an operator facing the front of the machine) and the lever 614L being that controlled by the left hand reel. Inasmuch as the two push rods 604 cross beneath the center of the printing table, the swinging lever 614L will be at the right hand side of the machine and the swinging level 614R will be at the left hand side of the machine.

The swinging levers each carry a roller 618R—618L which rides in the slotted end of a follower 620R—620L supported at one end of a cam push rod 622R—622L which is biased towards the roller 618R—618L by a light tension spring 624R—624L. Said rod is slidably journaled in a bearing 626 supported in one of a pair of plates 628 which are welded to a cam mounting block 630, said block being attached to a fish plate 632 secured to the housing of the motor 558. As will be apparent from Fig. 27, both swinging levers 614R—614L operate a similar kinematic train, the only difference between said trains residing in the fact that the push rod 622R is above the push rod 622L and said push rods are moved in opposite directions by their respective swinging levers. Each push rod has a pilot rod 634R—634L journaled in a bearing 636R—636L in the opposite plate 628. Said push rods are suitably constrained against rotary movement, as for example by making these rods of non-circular cross section, e. g. square. In the illustrated machine this constraint is accomplished by cooperation between the roller 618R—618L and the slot in the follower 620R—620L.

The push rod 622R has fixed to it a dog supporting block 638 on whose undersurface a dog 640 is rotatably mounted by means of a shoulder screw 642. Said dog is biased in a counterclockwise direction (as viewed from the top of the machine) by a compression spring 644 and its movement in this direction is limited by a stop 646 against which a pin 648 adjustably mounted on the dog 640 is adapted to abut. The operative portions of the dog 640 comprise a surface 650 (Figs. 28-31) parallel to the longitudinal axis of the cam push rod when the dog is in normal position (when the pin 648 abuts the stop 646), another surface 652 adjacent the surface 650 and inclined outwardly away from the longitudinal axis of said rod when the dog is in normal position, and a surface 654 substantially perpendicular to the surface 650 and comprising a blunt end for the dog. This latter surface 654 is such that pressure against the same at a point remote from the spring 644 will tend to rotate the dog in a counterclockwise direction. Said dog cooperates with a roller 656 having a vertical axis of rotation and journaled on a cam lever 658. This lever is pivotally secured to the block 630 by a shoulder screw 660 and suitable means, shortly to be described, biases the lever to the position illustrated in solid lines in Fig. 26, this being a neutral or normal position occupied by the lever when the drive of either reel in a take-up direction is being started.

The end of the cam lever remote from the roller carrying end has an arm 662 with a cam surface 664 engaging a roller 666 on a follower rod 668. This rod supports another roller 670 in an engagement with a control arm 672 urged against the roller 670 by a tension spring 674. The control arm 672 is the governing element of the speed reduction drive 564. Said drive is of any conventional type such that, when the control element is moved, the reduction ratio from the motor shaft to the output shaft 556 is varied. By way of example, in the illustrated machine a reduction speed drive of the planetary gear type is employed, the same being manufactured by Graham Transmissions, Inc. of Milwaukee, Wisconsin. This drive has a speed reduction which is varied by rotating a shaft 676 to which the control arm 672 is fixed.

The speed reduction drive is so arranged that, when the control arm is in its normal position, shown in full lines in Fig. 26, a certain minimum speed reduction is obtained, i. e. in this position of the control arm the motor 558 will drive the reel on which the blanket is being taken up at a predetermined maximum speed. When the control arm is in the position indicated by the dot and dash lines in Fig. 26 a certain maximum speed reduction is obtained and the driven reel will be turned at its predetermined slowest speed. The speed reduction drive 564 is such that the rate of change in the speed reduction ratio is approximately directly proportional to the change in angular position of the control arm.

When one of the reels is empty the swinging lever 614—614L associated therewith will be remote from the nearest plate 628, as exemplified by the left hand lever 614L in Figs. 26 and 27. If the right hand reel 478 is empty, the block 638 moved by the lever 614R will be pulled by the spring 624R toward the plate in which its push rod is journaled. This will dispose said block and its dog 640 to one side (the right side as viewed in Figs. 26 and 27) of the roller 656 on the cam lever. The parts will then be in the relative positions schematically indicated in Fig. 28.

If the motor 558 now is actuated to drive the right hand reel in a take up direction, the swinging lever 614R will slowly move over toward the plate 628 as the reel starts to fill up. As this movement begins, the end surface 654 of the dog 640 will push against the roller 656 turning the cam lever in a counterclockwise direction as viewed from the top of the machine, this being the condition illustrated in Fig. 28. Swinging the cam lever causes the cam surface 664 to turn about the screw 660. Said surface is designed to shift the follower 668 against action of the spring 674, the surface being so shaped that it will change the rate at which the drive 564 reduces the speed of the reel in direct proportion to the increase in the diameter of the blanket as sensed by the master caliper arm 594 and swinging lever 614R.

Inasmuch as the angular position of the swinging lever 614R is directly proportional to the diameter of the reeled blanket and since the change in angular position of the cam lever 658 is approximately directly proportional to the change in angular position of the swinging lever 614R, the cam surface 664 may be approximately in Archimedean spiral, if the change in the speed ratio of the drive 564 is directly proportional to the change in angular position of the control arm 672. It will, of course, be understood that the cam surface 664 may be slightly modified in case the linkage system, the dog and cam lever, and the response of the speed reduction drive to the control arm is not exactly as above described. The modification will be such that the speed at which the take-up reel is turned will be inversely proportional to the diameter of the blanket on said reel.

In the operation of the device, after the dog has pushed the roller 656 over to a tripping point where said roller clears the edge of the surface 654, the roller will begin to swing back to its idle position moving in a clockwise direction. This extreme point is indicated in Fig. 29. As the roller starts to swing back under the restoring influence of spring 674, it will turn the dog 640 in a clockwise direction about the shoulder screw 642 against the action of the spring 644 as indicated in Fig. 30. The cam lever will come to rest in its idle position as indicated in Fig. 31 on the opposite side of the inclined surface 652. The roller now is barely in contact with the surface 650, said roller being adjustably mounted on the cam lever 658 for this purpose (see Fig. 26).

Thus far there has only been described the kinematic train interconnecting the control arm 672 and the dog actuated by the cam push rod 622R. A similar train connects the other push rod 622L and said control arm. This train includes a dog supporting block 678 on the lower push rod. Said block has pivotally secured to its upper face a dog 680 which is the mirror image of a dog 640. The dog 680 is in line with the dog 640 but is offset to the left as best seen in Fig. 26. The spacing between said dogs is such that, when the cam lever 658 snaps back to normal position after having been actuated by one of said dogs, it will rest against the end surface 654 of the other dog.

It is to be noted that, when the roller 658 is moving back to normal position and pushing out of its way the dog which has just actuated it, it will simultaneously engage the inclined surface 652 of the other dog to depress said latter dog and likewise move it out of the way, so that there is nothing to prevent the cam lever from being restored to idle position.

It has been taken for granted in the foregoing description that the same roller 658 is engaged by both dogs. However, two rollers are provided, to wit: the roller 656 already mentioned and a second roller 682 which depends from the cam lever 658 and is aligned with the roller 656.

The dog 680, when operative, acts to turn the cam lever 658 in a clockwise direction from the solid line shown in Fig. 26 to the right hand dot-and-dash position. As it moves in this direction, the cam surface 640 is not effective. Accordingly we provide a second cam surface 684 likewise approximately in the shape of an Archimedean spiral and a mirror image of the cam surface 665. The cam surface 684 cooperates with the roller 666 in the same manner as the cam surface 664.

The position of the dogs should be so adjusted with respect to the diameter of the blanket and the reel that the effective dogs will be tripped by the roller 656 moving to idle position when the take-up reel is as full as desired. Said adjustment may be accomplished by controlling the settings of the turn buckles 602, 606. If it is desired to shorten or lengthen the range of movement of the dogs in order to obtain a wider range of speed control, the turn-buckle 602 may be moved along the length of the caliper arm 594, a slot 686 being formed in said arm to enable such adjustment to be effectuated.

*The electric control for the power blanket-drive*

(Figs. 2, 24 and 32)

When, in the operation of the machine, it is desired to drive the blanket by motor in a given direction, as for example onto the right hand reel, a right hand starting button 688 (Fig. 2) is momentarily depressed. This will turn the motor 558 over in the proper direction and at the same time energize the solenoid 590 on the right hand clutch so that the right hand reel will be power driven. The speed of the reel upon starting will be high since at this time the roller 666 is at the meeting point of the two diverging cam surfaces 664, 684. If it is desired to have the left hand reel acting as the take-up reel the left hand starting button 690 is pressed. Regardless of which button is depressed, the knobs 540 on the right and left hand handwheels should first be pushed in, so that said wheels will not turn as the blanket is power-driven.

When the blanket is being driven by motor there is a tendency for the operator to relax his attention and there is a possibility that the drive of the take-up reel may continue so far that it will pull the end of the blanket off of the supply reel. To prevent this from happening, an automatic stop means in included in the circuit for the motor 558, said means being operative to open the circuit for the motor when the take-up reel has had a predetermined length of blanket convoluted thereon. Said stop means, as shown herein, consists of a momentary switch 692 adjustably mounted on each of the brackets 596 with the actuating finger thereof in the path of travel of the lower end of the master caliper arm 594. The contacts for said switch are normally closed and will open when engaged by the lower end of the caliper arm. This arrangement also prevents the motor from starting up an already full take-up reel, if the wrong blanket motor starting button is depressed.

The electric wiring circuit for the blanket motor 558 is shown in Fig. 32. Said motor is energized from a three-phase power line consisting of three buses 694, 696, 698. One phase 694—696 is used for the control circuit. When the right hand starting button 688 is depressed it closes a pair of normally open contacts 700 to complete a circuit from bus 694 to bus 696 through the momentarily closed contacts 700, a wire 702, an operating coil 704 of a right hand relay 705, a wire 706, a set of normally closed contacts 708 of the momentary switch 692R associated with the right hand master caliper arm, a wire 710, a set of normally closed contacts 712 of a momentary stopping switch 714 (Fig. 2), and a wire 716.

Depressing the right hand starting button also energizes an operating coil 718 of the solenoid 590 for the right hand clutch 578—580R from wire 702 through wires 720, 722.

As soon as the right hand relay 705 is energized it closes four pairs of normally opened contacts 724, 726, 728 and 730. The contacts 724 serve to provide a holding circuit for said relay and the remaining three contacts energize the motor in a right hand sense, that is to say, in such direction that, if connected to the right hand reel, it will turn the same in a proper direction to make said reel pull the blanket across the printing table. It is pointed out that closing the holding contacts 724 provides an alternative circuit to maintain the operating coil 718 energized after the right hand starting button is released.

Once the motor has been energized in a right hand sense it will continue to move the blanket onto the right hand reel at a constant linear speed until either the right hand reel is full enough to actuate the momentary switch 692R or until the operator pushes the stop button 714.

The circuit controlled by the left hand starting button 690 is substantially similar to that just described, being effective however to energize a solenoid 732 for the left hand clutch 578—580L instead of the right hand clutch and connecting the buses 694, 696, 698 to the motor 558 with one phase reversed.

*Anti-sag control*

(Figs. 24, 25 and 32)

When the blanket is stopped, at some time during or at the end of its travel, when printing or drying or applying or stripping a web, there is a tendency for the two reels to turn a few degrees in an unwinding direction so as to relieve the tension in the portions of the blanket overlying the printing table and in the convoluted turns of the blanket on the reels. There also is a tendency for the supply reel to turn under its own momentum even when no longer driven. These actions have two undesirable results, to wit, they slacken the portion of the blanket on the printing table and they permit the lower portion of the outermost turn of the reeled blanket to sag. The slackening of tension on the printing table may, depending upon the condition of the blanket, permit the blanket to become so distorted that it will interfere with printing, and the sag in the outermost turn of the blanket will cause the blanket to become loosely wound.

Pursuant to an ancillary feature of our invention, these difficulties are overcome by the provision of an anti-sag mechanism which basically comprises means to secure the reels against rotation when the sag in the reels exceeds a certain predetermined amount. Said means comprises a secondary caliper arm 734 rotatable about a pin 736 and mounting a gear 738 which meshes with another gear 740 fixed to the master caliper arm 594. The two gears have the same pitch diameter and number of teeth. The secondary caliper arm is adjustable relative to the gear 738 in order that the position of said arm may be set in such fashion that the tip thereof will be near (but not touching) the bottom of the outermost turn of the blanket on which the roller 598 rests higher up. A momentary switch 742 is adjustably secured to the tip of the secondary caliper arm, said switch having a roller actuating element 744.

In the operation of the anti-sag mechanism the roller 598 will always be pressed against a firm portion of the reeled blanket and will move in and out as the blanket is taken up or fed. Such motion will cause the actuating element 744 to move toward and away from the shaft 484 but to always be spaced a short distance from the bottom of the outermost turn of the reeled blanket, because of the setting of the secondary caliper arm. If, however, when the reel is stopped, the blanket should unreel and permit the outermost turn of the blanket to sag, said turn will after moving a short distance downward press against the roller actuating element 744 to operate the same.

As shown in Fig. 32 the momentary switch 742 has a pair of normally closed contacts 746 series-connected in the operating circuit for a coil 748 of a solenoid 750 whose armature 752 operates a brake 754 on the shaft 484 of the reel associated with the switch 742. The anti-sag mechanism just described is at the left hand side of the machine and its components characterized by a qualifying letter "L." An exactly similar anti-sag mechanism is provided on the right hand side of the machine, the same being denoted by the qualifying letter "R." The brakes 754 are spring loaded to effective position, that is they will be set when their operating coils are deenergized and will release upon actuation of said coils. Said brakes are quite light and the reels can easily be turned by hand even when one or both brakes are on. However, the brakes are heavy enough to prevent the blankets from unreeling by themselves so that, in ordinary printing operation, if, after the blanket has been advanced two frames, there is sufficient friction in the reel shaft bearings to prevent the reels from turning further, the brakes will stay free, but, if the reel should turn so much that the blanket would tend to become markedly loose, the brakes will set before this occurs.

*The drying mechanism*

(Figs. 1, 2, 24, 25 and 32)

The freshly printed web can be dried in any suitable manner, fans 756 being shown herein for that purpose. Said fans are driven by motors 758 supplied from the buses 694—698 and controlled by a fan switch 760 operated by a button 762 on the front frame of the printing table (Fig. 2). It is pointed out that the power for the brakes 754 is derived from the fan circuit inasmuch as it is desired to avoid leaving the power for the brakes on when an operator goes away from a machine, and there is but little chance that the operator will walk away and leave the fans running over night.

Two fans are provided, one for the left hand and one for the right hand reel. Said fans blow air toward the side of the reel closest to the printing table, the fans being located near the floor so that each stream of air generated is directed toward the lower surface of the wound blanket on the reel. The air moved by the fan is confined and directed toward and around the freshly printed surface of the blanket by a housing 764 substantially surrounding each of the reels and its cradle frame. The front and back walls of the housing are located close to the reel flanges 482, and the end wall 766 of the housing is curved so as to form a deflector which guides the air up around toward the top of the outermost convoluted layer of the blanket.

It is desirable to change the angle at which air leaves the surface 766 in order to direct such air upon the variably positioned top surface of the outermost layer of the blanket. To accomplish this, a vane 768 is pivoted to the end wall 766 in a fashion such as to turn about an axis parallel to the reel shaft. Said vane fixedly carries a follower lever 770 having a roller 772 at its free end which rests on the wound blanket. The roller is so positioned with respect to the vane that, as the reel fills up, the vane will continue to blow air downwardly but at a changing angle on the freshly printed surface of the web coming on to the top of the reel.

It may be mentioned that the belts 58, 60 function to space apart adjacent convoluted and not yet fully dried layers of the textile web. If the fabric is not dried by the action of the fans on the printing pass alone, the blanket can be power-driven back and forth between the reels with the fans going until the web is dried sufficiently to either remove or to print the next color thereon.

An alternative blanket support
(Fig. 33)

Instead of having the two reels 44, 46 disposed on opposite sides of the printing table, we may locate said reels on the same side of the table as shown in the machine 800. This modified machine has the advantage that it can be manufactured more economically and adjusted more readily than the machine 40.

Said machine 800 is essentially similar to the machine 40, and includes a printing table 802, a scraper and a scraper actuating means identical with those hereinabove described. A blanket 804 is attached at its opposite ends to reels 806, 808 mounted alongside the printing table 802, both said reels being located to the left of the table as viewed in Fig. 33. Said blanket has a pair of narrow guide and spacer belts 810 permanently secured to its lower surface adjacent the lateral edges thereof, these belts being employed for the purpose of front-to-back (transverse) registration. The reels 806, 808 are rotatably supported in any suitable manner, e. g. in the same fashion as the reels 44, 46.

The portion of the blanket extending between the outer reel 806 and the printing table travels over an idling roller 812 having a construction like that of the roller 66, in that its front end includes a double flanged guide sheave to receive the front belt 810 and its rear end is of reduced diameter to accommodate the rear belt. A vertically adjustable keeper wheel 814 prevents the blanket 804 from riding up high enough to allow the front belt 810 to leave the flanged front sheave of the roller 812. A similar keeper wheel overlies the portion of the blanket above the rear belt.

On the (right hand) side of the machine opposite to that on which the two reels 806, 808 are disposed, we provide means for turning the blanket back so that a portion of the blanket which has left one of the reels and traversed the printing table (either in printing or non-printing position) will retraverse said table in order to reach the other reel. Said blanket turning means may comprise guide or return rollers the number of which will depend upon the specific construction and arrangement of the various components of the printing machine. As illustrated herein, we have disclosed two such guide rollers 816, 818, the upper 816 of which has its top surface at or slightly below the printing level for the blanket 804. Both rollers are rotatably supported by outrigger bearings 820. The lower roller 818 has its undersurface located at a level of the machine where no operating components are located beneath the printing table. In the machine 800 such a level is present beneath the motor which is used for power driving of the blanket 810.

Another idler roller 822, situated on the same side of the machine as the reels 806, 808, may be included to insure passage of the blanket at a fixed plane beneath the printing level. Keeper wheels 824 are associated with the roller 822 to hold the blanket in contact therewith regardless of the diameter of the portion of the blanket wound about the reel 808.

The guide roller 816, like the roller 812, has a forward flanged sheave to receive the front belt 810 and maintain transverse registration of the blanket at the right hand side of the machine. Likewise the rear of the roller 816 is of reduced diameter to accommodate the rear belt. If desired, the rollers 818 and 822 also may include front flanged sheaves and stepped down rear ends.

It may be mentioned that under various other circumstances where the machine parts carried by the printing table are not identical with those shown in Figs. 1–32, only a single guide roller such as roller 816 need be employed.

The machine 800 includes a pair of hand wheels 826 which actuate chains 828, 830, one connected to the reel 806 and the other to reel 808 so that turning the left hand handwheel will turn over the reel 806 and turning the right hand handwheel will turn over the reel 808.

It will thus be seen that we have provided machines which achieve the several objects of our invention and are well adapted to meet conditions of practical use.

As various possible embodiments might be made of the above invention, and as various changes might be made in the embodiments above set forth, it is to be understood that all matter herein described or shown in the accompanying drawings is to be interpreted as illustrative and not in a limiting sense.

Having thus described our invention, we claim as new and desire to secure by Letters Patent:

1. In combination in a silk screen printing machine, a printing table, a scraper, means to mount said scraper for movement back and forth across said table, a reversible electric motor to move said scraper back and forth across said table, switch means at the front and back of the machine to reverse the direction in which said motor moves said scraper as said scraper approaches one end of the machine and to render said motor ineffective to move said scraper as said scraper approaches the other end of the machine, brake means to aid in stopping said scraper, and switch means at the front and back of the machine actuable by said scraper to render said brake means effective as said scraper approaches the front of the machine and as said scraper approaches the back of the machine.

2. In combination in a silk screen printing machine, a printing table, a scraper, means to mount said scraper for movement back and forth across said table, a reversible electric motor to move said scraper back and forth across said table, switch means at the front and back of the machine to reverse the direction in which said motor moves said scraper as said scraper approaches one end of the machine and to render said motor ineffective to move said scraper as said scraper approaches the other end of the machine, brake means to aid in stopping said scraper, and switch means at the front and back of the machine actuable by said scraper to render said brake means effective as said scraper approaches the front of the machine and as scraper approaches the back of the machine, said last named switch means being disposed to be actuated by said scraper at either end of the machine before said first named switch means is rendered effective.

3. In combination in a silk screen printing machine, a printing table, a scraper, means to mount said scraper for movement back and forth across said table, a reversible electric motor to move said scraper back and forth across said table, switch means at the front and back of the machine to reverse the direction in which said motor moves said scraper as said scraper approached one end of the machine and to render said motor ineffective to move said scraper as said scraper approaches the other end of the machine, brake means to aid in stopping said scraper, and switch means at the front and back of the machine actuable by said scraper to render said brake means effective as said scraper approaches the front of the machine and as said scraper approaches the back of the machine, all of said switch means being adjustable in a direction having a substantial component parallel to the direction in which said scraper moves.

4. In combination in a silk screen printing machine, a printing table, a pair of parallel rails extending from the back to the front of the table and spaced apart in a direction from side to side of the table, a scraper between said rails, means to mount said scraper on said rails whereby it can be moved back and forth across said table, power driven means to move said scraper back and forth across said table, means to reverse the direction in which said power driven means moves said scraper as said scraper approaches one end of the machine and to render said power driven means ineffective to move said scraper as said scraper approaches the other end of the machine, brake means to aid in stopping said scraper when it is reversed and when the power driven means is rendered ineffective, switch means at the front and back of the machine actuable by said scraper to render said brake means effective, and means to mount said switch means on said rails, said switch mounting means being arranged for adjustment along said rails.

5. In combination in a silk screen printing machine, a printing table, a pair of parallel rails extending from the back to the front of the table and spaced apart in a direction from side to side of the table, a scraper between said rails, a means to mount said scraper on said rails whereby it can be moved back and forth across said table, power driven means to move said scraper back and forth across said table, switch means controlled by said scraper to reverse the direction in which the power driven means moves said scraper as said scraper approaches one end of the machine and to render said power driven means ineffective to move said scraper as said scraper approaches the other end of the machine, brake means to aid in stopping said scraper when it is reversed and when said power driven means is rendered ineffective, switch means at the back and front of said machine actuable by said scraper to render said brake means effective, and means to mount all said switch means for adjustable movement along said rails.

6. In combination in a silk screen printing machine, a printing table, a pair of parallel rails extending from the back to the front of the table and spaced apart in a direction from side to side of the table, a scraper between said rails, a means to mount said scraper on said rails whereby it can be moved back and forth across said table, power driven means to move said scraper back and forth across said table, switch means controlled by said scraper to reverse the direction in which the power driven means moves said scraper as said scraper approaches one end of the machine and to render said power driven means ineffective to move said scraper as said scraper approaches the other end of the machine, brake means to aid in stopping said scraper when it is reversed and when said power driven means is rendered ineffective, switch means at the front and back of said machine actuable by said scraper to render said brake means effective, means to mount all said switch means for adjustable movement along said rails, and buffing means at the front and back of the machine to aid in stopping the scraper when it is reversed and when the power driven means is ineffective to move said scraper.

7. In combination in a silk screen printing machine, a printing table, a scraper, means to mount said scraper for movement back and forth across said table, a reversible electric motor to move said scraper back and forth across said table, switch means at the front and back of the machine, starting means, and an electrical circuit including the means to connect said motor to rotate in one direction and means to connect said motor to rotate in the other direction, said electrical circuit being operative in conjunction with said starting means, said switch means and said electric motor to render effective the connecting means to rotate said motor in one direction when the starting means is actuated at such time as the scraper is at one end of the machine and engaging the switch means at said end of the machine, whereby said scraper will be moved across to the opposite end of the machine, said electrical circuit being then operative when said scraper engages the switch means at the opposite end of the machine to render effective the connecting means for rotating the motor in the opposite direction, whereby said scraper will be moved back to its starting point, said electrical system being then operative when the scraper engages the switch means at the starting point to render said electric motor ineffective to move said scraper, said electrical circuit including means to prevent the means for rotating the motor in said one direction from becoming ineffective while said scraper is moving away from its starting point if the starting means is released.

8. In combination in a silk screen printing machine, a printing table, a scraper, means to mount said scraper for movement back and forth across said table, means to mount said scraper for movement toward and away from said table, inclined tracks at both ends of said table to raise said scraper as it approaches an end of a stroke and to lower said scraper as it begins moving across the table, said lowering operation being initiated by the weight of said scraper and resilient means to cushion the lowering of said scraper.

9. In combination in a silk screen printing machine, a printing table, a scraper, means to mount said scraper for movement back and forth across said table, power driven means to move said scraper back and forth across said table, means controlled by said scraper to reverse the direction in which said power driven means moves said scraper, means controlled by said scraper for checking the movement of said scraper as it approaches the front and back of the machine, means for raising said scraper as it approaches either end of machine, means for lowering said scraper as it starts to move across said machine, and means to adjustably mount the several means controlled by said scraper in a direction parallel to the movement of said scraper so that said machine can be adjusted to take different sizes of screens.

10. In combination in a silk printing machine, a printing table, a pair of parallel rails extending from the back to the front of said table and spaced apart in a direction from side to side of said table, a scraper, a carriage at both ends of said scraper, means to mount each end of said scraper for free vertical movement with respect to said carriages, a truck for each of said carriages, each said truck riding on one of said rails whereby said scraper can be moved back and forth across the machine, power driven means to move said carriages back and forth across the machine, and elements mounted on said rails at the ends thereof for adjustable movement along the rails, said elements supporting means controlled by the scraper to reverse the direction in which said power driven means moves said carriages, means controlled by said scraper for checking the movement of said carriages as they approach both ends of said stroke, means for raising said scraper as it approaches both ends of its strokes, and means for lowering said scraper as it starts to cross the machine.

11. In combination in a silk screen printing machine, a printing table, a scraper, means to mount said scraper for movement back and forth across said table, and track means at an end of said table for raising said scraper as it approaches said end of the table and for lowering said scraper as it leaves said end, said track means including an inclined raising portion and a normally horizontal portion at the level of the upper end of the inclined portion, said horizontal portion being mounted to move downwardly under the weight of said scraper.

12. In combination in a silk screen printing machine, a printing table, a scraper, means to mount said scraper for movement back and forth across said table, means to mount said scraper for movement toward and away from said table, power driven means to move said scraper back and forth across said table, means controlled by said scraper to reverse the direction in which the power driven means moves said scraper as said scraper approaches one end of the table and to render said power driven means ineffective to move said scraper as said scraper approaches the other end of the table, means at both ends of the table for lifting said scraper away from the table as it approaches an end of a stroke, means for lowering said scraper as it starts an opposite stroke, and means for selectively rendering effective the lowering means at the end of the table at which the power driven means is rendered ineffective.

13. In combination in a silk screen printing machine, a printing table, a pair of parallel rails extending from the back to the front of the table and spaced apart in a direction from side to side of the table, an elongated scraper, a carriage at each end of said scraper, means to mount each end of said scraper on the carriages for vertical movement with respect thereto, each of said carriages having a truck riding on a rail whereby said scraper will be guided for movement back and forth across the table, power driven means for separately moving both carriages back and forth across said table substantially in synchronism, means permitting relative pivotal movement about a vertical axis of each end of said scraper with respect to its associated carriage, and means permitting sliding movement in a direction parallel to the longitudinal axis of the scraper of each end of said scraper with respect to its associated carriage.

14. In combination in a silk screen printing machine, a printing table, a pair of parallel rails extending from the back to the front of the table and spaced apart in a direction from side to side of the table, an elongated scraper, a carriage at each end of said scraper, means to mount each end of said scraper on the carriages for vertical movement with respect thereto, each of said carriages having a truck riding on a rail whereby said scraper will be guided for movement back and forth across the table, power driven means for separately moving both carriages back and forth across said table substantially in synchronism, means permitting relative pivotal movement about a vertical axis of each end of said scraper with respect to its associated carriage, means permitting sliding movement in a direction parallel to the longitudinal axis of the scraper of each end of said scraper with respect to its associated carriage, and means to permit relative rotation of said scraper and said carriages about axes parallel to said rails.

15. In combination in a silk screen printing machine, a printing table, an elongated scraper, means to support one end of said scraper, means to support the other end of said scraper, means to move said supporting means back and forth across the table substantially in synchronism, means permitting relative pivotal movement about a vertical axis of each end of said scraper with respect to its associated supporting means, means permitting sliding movement in a direction parallel to the longitudinal axis of the scraper of each end of said scraper with respect to its associated supporting means, and means to permit relative rotation of each end of said scraper with respect to its associated supporting means about an axis parallel to the movement of the scraper.

16. In combination in a silk screen printing machine, a printing table, a stencil screen, a stencil screen frame, a scraper, a scraper carrying member, and means to mount said member for constrained movement across said table with the scraper in the frame and for free downward movement, said means comprising tracks extending across the table, a pair of carriages, one movable along each track, two pairs of members, each pair being associated with a different one of said carriages, anti-friction rollers to guide the members of each pair for relative vertical movement with respect to one another, one member of each pair being attached to a different carriage and the other member of said pairs supporting opposite end portions of the scraper carrying member, whereby the full weight of said scraper carrying member presses said scraper against the screen and power means to move the scraper carrying member back and forth across the screen.

17. In combination in a printing machine, a printing table, a pair of parallel rails extending from the front to the back of the table and spaced apart in a direction from side to side of the table, a scraper, a plate with parallel vertical side edges mounted at each end of said scraper, a carriage riding on each of said rails, anti-friction rollers on each carriage to receive a plate and slidably engage the side edges thereof, and power means to move the scraper back and forth along the rails.

18. In combination in a silk screen printing machine, a printing table, a stencil screen frame, means movable towards and away from said table for supporting said frame, means including an element and an eccentric support in which said element is rotatably received for securing said frame to said frame supporting means whereby said stencil frame may be adjustably positioned with respect to its supporting means, and means to guide the eccentric support for unrestrained bodily movement in a vertical direction.

19. In combination in a silk screen printing machine, a printing table, a stencil screen frame member, a member movable toward and away from said table for supporting said frame member, an element, a second element rotatably and shiftably receiving said first element, the direction of shifting being parallel to the axis of rotation, means to connect said first element to one of said members, and means to connect said second element to the other of said members for rotation about an axis offset with respect to said first element, at least one of said means being freely vertically movable with respect to the member to which it is connected.

20. In combination in a silk screen printing machine, a printing table, a stencil screen frame member, a member movable toward and away from said table for supporting said frame member, an element, a second element rotatably and shiftably receiving said first element, the direction of shifting being parallel to the axis of rotation, means to connect said first element to one of said members, means to connect said second element to the other of said members for rotation about an axis offset with respect to said first element, at least one of said means being freely vertically movable with respect to the member to which it is connected, and means to selectively prevent relative rotatable and shiftable movement of said elements.

21. In combination in a silk screen printing machine, a printing table, a stencil screen frame, a stencil frame supporting means, and means to interconnect said frame and said frame supporting means at an end of the machine, said means including an element secured to the front of the stencil frame and a second element carried by said supporting means, said second element including a portion slidably received in a vertical slot in said frame supporting means whereby said second element can be rotated in said slot, said first element being rotatably and shiftably received in said second element in a position offset with respect to the axis of rotation of the second element in the frame supporting means.

22. In combination in a silk screen printing machine, a printing table, a stencil screen frame, a stencil frame supporting means, and means for interconnecting said frame and frame supporting means at an end of the machine, said last named means including a vertical guide on the frame supporting means, an element slidable and rotatable in said guide, means to prevent movement of said element in the direction of its axis of rotation, said element including a portion offset with respect to the axis of rotation of said element for rotatably and shiftably receiving a second element secured on the frame.

23. In combination in a silk screen printing machine, a printing table, a stencil screen frame, a stencil frame supporting means, and means for interconnecting said frame and frame supporting means at an end of the machine, said last named means including a vertical guide on the frame supporting means, an element slidable and rotatable in said guide, means to prevent movement of said element in the direction of its axis of rotation, a second element carried on the frame, said first named element including a portion offset with respect to the axis of rotation thereof for rotatably and shiftably receiving said second element, and means to selectively prevent relative movement of said elements.

24. In combination in a silk screen printing machine, a printing table, a stencil screen frame, a stencil frame supporting means, and separate means for interconnecting said frame and frame supporting means at the front and back of the machine, said last named means each including a vertical guide on the supporting means, an element slidable and rotatable therein, a second element carried on the frame, said first element including a portion offset with respect to the axis of rotation thereof for shiftably and rotatably receiving said second element.

25. A combination as set forth in claim 24 wherein one of the means for interconnecting the frame and frame supporting means includes means to prevent movement of the first element in a direction parallel to the axis of rotation thereof.

26. In combination in a silk screen printing machine, a stencil screen frame, means to support said frame, said supporting means being mounted for movement toward and away from said table and being biased by its own weight towards said table, a vertically reciprocable element having a portion bearing against the under surface of said supporting means, a counterpoise weight, means to mount said weight so that the force urging the same downwardly biases said element upwardly, and means to selectively fix said element against vertical reciprocation when it is lowered, said last named means comprising a movable piece carried by a stationary part of the machine and shiftable into a position in which it intercepts the upward path of travel of a portion of said element.

27. In combination in a silk screen printing machine, a printing table, a stencil screen frame, means to support said frame, said supporting means being mounted for movement toward and away from said table, a counterpoise weight, means to support the weight, means to pivotally mount the weight supporting means whereby the weight exerts a turning moment, means to apply said turning moment to said frame so as to bias the same away from the table, said last two named means being arranged to vary the turning moment applied to the frame as the weight supporting means oscillates during raising and lowering of the frame, said last named means being operable to lessen the applied turning moment as the frame moves toward the table, and means to adjust the turning moment of the weight so as to counterbalance the weight of the stencil screen frame and supporting means therefor when said frame is furthest from said table.

28. In combination in a silk screen printing machine, a printing table, a stencil screen frame, means to support said frame, said supporting means being mounted for movement toward and away from said table, a vertically reciprocable element having a portion bearing against the under surface of said supporting means, a lever mounted for pivotal movement with respect to said table and so disposed that an end thereof engages said element, a counterpoise weight adjustably mounted adjacent the other end of said lever, said weight being located above the pivot point of said lever when said frame is closest to said table and being nearer to the horizontal plane of said pivot point when said frame is furthest from said table, said weight being adjusted to counterbalance the weight of the stencil screen frame and supporting means therefor when said frame is furthest from said table.

29. In combination in a silk screen printing machine, a printing table, a stencil screen frame member, means to pivotally mount an edge of said frame member on said table, a second member for supporting the edge of said first member remote from the pivoted edge thereof, means to support said second member for vertical movement, a counterpoise for biasing said second member upwardly, one of said members having a roller mounted to rotate about an axis parallel to the pivot axis and the other of said members having a slot in which said roller rides and which slot extends in a direction perpendicular to the pivot axis whereby engagement between the roller and slot will hold the frame member in lateral registry while the second member moves the frame up and down.

30. A combination in a silk screen printing machine, a printing table, a scraper, means to mount said scraper for movement back and forth across said table, and a plurality of sets each including a lifting cam and lowering finger, there being a set at the front and at the back of the machine and at each side thereof, each set being disposed so that the lifting cam and then the lowering finger are traversed by the scraper mounting means at the front and at the back of the machine, said cams and fingers being hinged at the ends thereof closest to the associated front and back ends of the machine, each lifting cam being sloped upwardly in the direction in which the scraper mounting means moves as it engages said cam, whereby the scraper mounting means after riding up a lifting cam and down a lowering finger can move beneath the lifting cam while raising the same after the direction of the travel of the scraper is reversed at the front and back of the machine.

31. In combination in a silk screen printing machine, a printing table, a scraper, means to mount said scraper for movement back and forth across said table, pairs of tracks at the front and at the back of the machine disposed so that the tracks of each pair are successively traversed by the scraper at the front and at the back of the machine, said tracks being hinged at the ends thereof closest to the associated front and back ends of the machine, the track of each pair furthest from the associated back and front ends of the machine being sloped upwardly in the direction in which the scraper moves as it engages said track, whereby the scraper can move beneath the sloped track while raising the same after the direction of the travel of the scraper is reversed at the front and back of the machine, and means to resiliently bias the track of each pair closest to the front and back of the machine upwardly to the level of the higher end of the other track of the pair.

32. In combination in a silk screen printing machine, a printing table, a scraper, means to mount said scraper for movement back and forth across said table, pairs of tracks at the front and at the back of the machine disposed so that the tracks of each pair are successively traversed by the scraper at the front and at the back of the machine, said tracks being hinged at the ends thereof closest to the associated front and back ends of the machine, the track of each pair furthest from the associated back and front ends of the machine being sloped upwardly in the direction in which the scraper moves as it engages said track, whereby the scraper can move beneath the sloped track while raising the same after the direction of the travel of the scraper is reversed at the front and back of the machine, and means to selectively prevent rotation of the endmost track of the pair of tracks at the back of the machine at the level of the higher end of the other track of said pair.

33. In combination in a silk screen printing machine, a printing table, a scraper, means to mount said scraper for movement back and forth across said table, pairs of tracks at the front and at the back of the machine disposed so that the tracks of each pair are successively traversed by the scraper at the front and at the back of the machine, said tracks being hinged at the ends thereof closest to the associated front and back ends of the machine, the track of each pair furthest from the associated back and front ends of the machine being sloped upwardly in the direction in which the scraper moves as it engages said track, whereby the scraper can move beneath the sloped track while raising the same after the direction of the travel of the scraper is reversed at the front and back of the machine, means to selectively prevent rotation of the endmost track of the pair of tracks at the back of the machine at the level of the higher end of the other track of said pair, and means to bias upwardly to said level the endmost tracks of all the pairs of tracks.

34. In combination in a silk screen printing machine, a printing table, a draw bar, a gimbal at each end of the draw bar, means for moving said gimbal back and forth across the sides of the table, a pair of hangers, means slidably positioning said hangers on said draw bar in spaced relationship, means for fixing said hangers in any selected positions, an elongated scraper, and means mounting the ends of said scraper on said hangers for free pivotal movement within limits with respect to said hangers and for free vertical movement within limits with respect to said hangers.

JOHN B. THOMAS.
COURTNEY E. MOORHOUSE.

(References on following page)

References Cited in the file of this patent

UNITED STATES PATENTS

| Number | Name | Date |
|---|---|---|
| 1,490,400 | Owens | Apr. 15, 1924 |
| 1,530,616 | Pond | Mar. 24, 1925 |
| 1,759,476 | Allen | May 20, 1930 |
| 1,821,302 | Gorner | Sept. 1, 1931 |
| 1,832,828 | Borregard | Nov. 17, 1931 |
| 2,021,409 | Flanigan | Nov. 19, 1935 |
| 2,023,430 | McCain et al. | Dec. 10, 1935 |
| 2,039,909 | Kem et al. | May 5, 1936 |
| 2,162,440 | Masson | June 13, 1939 |
| 2,164,603 | Wheelwright | July 4, 1939 |
| 2,189,007 | Kessel | Feb. 6, 1940 |
| 2,207,818 | Perry et al. | July 16, 1940 |
| 2,210,474 | Tillett | Aug. 6, 1940 |
| 2,226,807 | De Save | Dec. 31, 1940 |
| 2,267,596 | Montague et al. | Dec. 23, 1941 |
| 2,321,134 | Fleisher et al. | June 8, 1943 |
| 2,355,930 | Thorne | Aug. 15, 1944 |